US012790270B2

(12) United States Patent
Shi et al.

(10) Patent No.: US 12,790,270 B2
(45) Date of Patent: Nov. 10, 2026

(54) NANO-MODIFIED WATERPROOF SEALER COMPOSITIONS AND METHODS FOR CONCRETE PRESERVATION

(71) Applicant: WASHINGTON STATE UNIVERSITY, Pullman, WA (US)

(72) Inventors: Xianming Shi, Pullman, WA (US); Zhipeng Li, Pullman, WA (US)

(73) Assignee: Washington State University, Pullman, WA (US)

( * ) Notice: Subject to any disclaimer, the term of this patent is extended or adjusted under 35 U.S.C. 154(b) by 433 days.

(21) Appl. No.: 18/684,757

(22) PCT Filed: Aug. 16, 2022

(86) PCT No.: PCT/US2022/075009
§ 371 (c)(1),
(2) Date: Feb. 19, 2024

(87) PCT Pub. No.: WO2023/023508
PCT Pub. Date: Feb. 23, 2023

(65) Prior Publication Data

US 2024/0368036 A1 Nov. 7, 2024

Related U.S. Application Data

(60) Provisional application No. 63/233,917, filed on Aug. 17, 2021.

(51) Int. Cl.
*C04B 24/42* (2006.01)
*C04B 14/02* (2006.01)
*C04B 14/10* (2006.01)
*C04B 28/04* (2006.01)
*C04B 103/65* (2006.01)
*C04B 111/00* (2006.01)
*C04B 111/27* (2006.01)

(52) U.S. Cl.
CPC ............ *C04B 24/42* (2013.01); *C04B 14/022* (2013.01); *C04B 14/104* (2013.01); *C04B 28/04* (2013.01); *C04B 2103/65* (2013.01); *C04B 2111/00482* (2013.01); *C04B 2111/27* (2013.01)

(58) Field of Classification Search
CPC ..... C04B 24/42; C04B 14/022; C04B 14/104; C04B 28/04; C04B 2103/65; C04B 2111/00482; C04B 2111/27
USPC .............................................................. 524/3
See application file for complete search history.

(56) References Cited

FOREIGN PATENT DOCUMENTS

DE 102019130907 A1 * 12/2020 ........... E01D 19/125
EP 1492743 A1 * 1/2005 ......... C04B 41/4922
EP 2660224 A1 * 11/2013 ............. C08K 5/544

* cited by examiner

*Primary Examiner* — Kelechi C Egwim
(74) *Attorney, Agent, or Firm* — WCF IP

(57) ABSTRACT

A waterproofing and dual-nano-engineering method and a resultant composition that includes a base sealer dual-nano-modified to alter the surface chemistry of a cementitious substrate and provide the formation of a rough nano/micro-scale hierarchical structure resulting from the introduction of the plurality of nanomaterials. The dual-nano-engineered sealer refines the microstructure of the cementitious substrate while enhancing its hydrophobicity with a water contact angle of at least 120° and increasing its resistance to salt-scaling and UV aging.

15 Claims, 13 Drawing Sheets

NANO-MODIFIED WATERPROOF SEALER COMPOSITIONS AND METHODS FOR CONCRETE PRESERVATION

CROSS-REFERENCE TO RELATED APPLICATION

The present application claims under 35 U.S.C § 119, the priority benefit of U.S. Provisional Application No. 63/233,917, filed Aug. 17, 2021, entitled "Nano-modified waterproof sealer compositions and methods for concrete preservation," which is incorporated herein by reference in its entirety.

STATEMENT OF GOVERNMENT INTEREST

This invention was made with government support under grant no. 69A3551947137 awarded by U.S. Department of Transportation. The government has certain rights in the invention.

FIELD OF INVENTION

The embodiments herein relate to sealer compositions that protect cementitious substrates from deterioration. In particular, the embodiments herein are directed to penetrating sealers modified by dual nanomaterials, preferably graphene oxide and montmorillonite nanoclay, that synergistically aid in enhancing the performance capabilities of the base sealer component to prevent/mitigate degradation of underlying cementitious materials.

BACKGROUND OF THE INVENTION

In cold regions, salts are used on the surface of cementitious materials like pavements, bridge decks, etc., as deicers. However, ever increasing traffic volume as well as an increasing reliance on the use of deicers for winter road maintenance operations pose a great risk to the durability of concrete pavements, bridge decks etc. Field experience suggests that the typical service life of siliconate-based concrete sealers o highway bridge decks is 3-4 years. As such, there is an urgent demand for more effective and enhanced sealers to preserve the integrity and durability of concrete infrastructure in the aggressive environments.

As a result, improved surface treatments have been sought after for greater protection and commercial products (sealants/sealers) developed due to the demand have relatively demonstrated an improved ability to protect concrete surfaces from salt-scaling and extend service life. Such example commercial surface treatments include silicates, which can provide waterproofing properties by filling the pore structure of building materials with silicone dioxide precipitation while silanes, siloxanes and siliconates have also been used to provide waterproofing properties by bonding with the substrate. Overall, commercial surface treatments function in different ways to protect the concrete surfaces. In particular, surface treatments are often divided into categories such as: 1) barrier coatings, which serve as a physical barrier to prevent ingress of water molecules and other aggressive species; 2) hydrophobic coatings, which inhibit water absorption and other soluble aggressive species; and 3) pore blockers, which fill the pores and transport tunnels on the surface layer of matrices to slow down the migration of water.

Background information on a siliconate based surface treatment of cement-based materials, is described in, "Design of $SiO_2$/PMHS hybrid nanocomposite for surface treatment of cement-based materials," published in Cement and Concrete Composites (Volume 87, March 2018), including the following, "A silica-based hybrid nanocomposite, $SiO_2$/polymethylhydrosiloxane ($SiO_2$/PMHS), is synthesized by a sol-gel process and used for surface treatment of hardened cement-based materials. The advantages of both normal organic and inorganic silica-based treatment agents are explored . . . ."

It is also to be appreciated that in recent years, a variety of nano-modified surface treatments have also been employed for protection of cementitious materials, wherein the nano-modified surface treatments have demonstrated a beneficial role of inducing a denser pore structure of cementitious materials. Nanomaterials that have been put to use for such surface treatments include nano-silica, nano-alumina, nano-clay, carbon nanotubes, graphene oxide, etc. The addition of such individual nanomaterials to sealers reduces the water absorption and gas permeability of the sealants.

Background information on using a nano-modified sealant for concrete surfaces, is described and claimed in China Patent No. CN110304942A entitled, "NANO SILICON SEALANT MATERIAL APPLIED TO CONCRETE GROUND AND USING METHOD OF NANO SILICON SEALANT MATERIAL," published Oct. 8, 2019, to Yang Shuhua, including the following. "The invention discloses a nano silicon sealant material applied to concrete ground and a using method of the nano silicon sealant material. The nano-silicon sealant material applied to the concrete ground comprises the following raw materials in parts by weight: 20-50 parts of a silicate, 5-12 parts of an assistant and 6-18 parts of a nano active ingredient. According to the method disclosed by the invention, the nano active ingredients in the raw materials are subjected to a deep reaction with free calcium and magnesium ions in concrete to generate a calcium silicate compound to seal capillary pores in the concrete, so that a compact high-strength wear-resistant dusting-free whole body is formed, and protection performance of the concrete structure is improved."

Background information on using nano-modified siliconate based sealers for concrete surfaces, is described and claimed in PCT Patent No. WO2012091688A1 entitled, "WATERPROOFING COMPOSITION," filed Dec. 22, 2011, to MISHCHENKO et al, including the following, " . . . The novel aspect of the invention is that the composition contains an organosilicon compound in the form of at least one of the following compounds: polymethylhydrosiloxane, polyethylhydrosiloxane, polymethylsiloxane, methyltricthoxysilane, aminopropyltriethoxysilane, and/or at least one of the following compounds: sodium or potassium methyl siliconate, sodium or potassium ethyl siliconate or at least one of the following compounds: sodium alumomethyl siliconate, sodium alumocthyl siliconate, and additionally contains a filler in the form of a nanodispersed silica or alumina powder or a silica nanopowder modified by organic compounds from among the alkylchlorosilane monomers . . . ."

Background information on using graphene oxide for surface treatment of concrete, is described in, "Graphene oxide for surface treatment of concrete: A novel method to protect concrete." published in Construction and Building Materials (Volume 243, 20 May 2020), including the following, " . . . graphene oxide (GO) can be applied as surface protection of concrete to prevent the transmission of water and ingress of chloride ions. The best method for applying GO and the effectiveness of the amount of GO on its performance to reduce the permeability of concrete surface were evaluated as well. Results indicated that at best GO coating on the concrete surface can reduce water absorption and capillary absorption of concrete by about 40 and 57%, respectively. The increase in the GO content leads to more reduction of water absorption and capillary absorption of concrete . . . ."

Accordingly, a need exists for an improved sealer to preserve the integrity and durability of concrete structures subjected to environmental conditions, especially adverse harsh environmental conditions. The embodiments disclosed herein address such a need by way of novel scaler that entails dual-nano-engineering the properties of commercial sealers, such as, but not limited to, a potassium methylsiliconate based-sealer, through use of nanomaterials that often, but not necessarily, include graphene oxide (GO) and Montmorillonite nanoclay (NC).

BRIEF SUMMARY OF THE INVENTION

In a first aspect, the embodiments herein are directed to a cementitious sealer that includes: a hydrophobic sealer layer; and a plurality of first nanomaterials and a plurality of second nanomaterials coupled to the hydrophobic sealer layer, wherein the plurality of first nanomaterials and the plurality of second nanomaterials modifies the sealer chemistry and are arranged as a plurality of solid nanocavities configured to increase a water contact angle via a plurality of solid-liquid-air interfaces.

In a second aspect, the embodiments herein are directed to a method for waterproofing a surface that includes: sequentially or simultaneously coupling a plurality of first nanomaterials and a plurality of second nanomaterials to a hydrophobic sealer, wherein the plurality of first nanomaterials and a plurality of second nanomaterials modifies the sealer chemistry; and coating a cementitious surface with the modified hydrophobic sealer, wherein the plurality of first nanomaterials and the plurality of second nanomaterials are arranged as a plurality of solid nanocavities configured to increase a water contact angle via a plurality of solid-liquid-air interfaces.

Accordingly, the nano-engineered sealer embodiments herein provide for a reduction of at least 70% in both the water absorption coefficient and gas permeability coefficient of the mortar, vs. about 38% induced by the original sealer. Moreover, the embodiments herein beneficially slow down the ingress of gaseous phases (e.g., $CO_2$ and $O_2$), and provides outstanding resistance to UV aging, moisture damage, and wear, as well as other chemical attacks (e.g., sulfate attack). Moreover, intended applications include, but not strictly limited to, the preservation and/or rehabilitation of concrete in general, brick, masonry, ceramics, stones, concrete foundations, piles, piers, tunnels, pavements, bridge decks, and other concrete components or structures and the like.

BRIEF DESCRIPTION OF THE DRAWINGS

Many of the drawings submitted herein are better understood as provided by the original images, which are not best depicted in patent application publications at the time of filing. Applicant considers the recreated images, as shown by the drawings, or images that are not representative of what was provided, as part of the original submission and reserves the right to present such images of the drawings in later proceedings.

DETAILED DESCRIPTION OF THE INVENTION

Figure 1A:
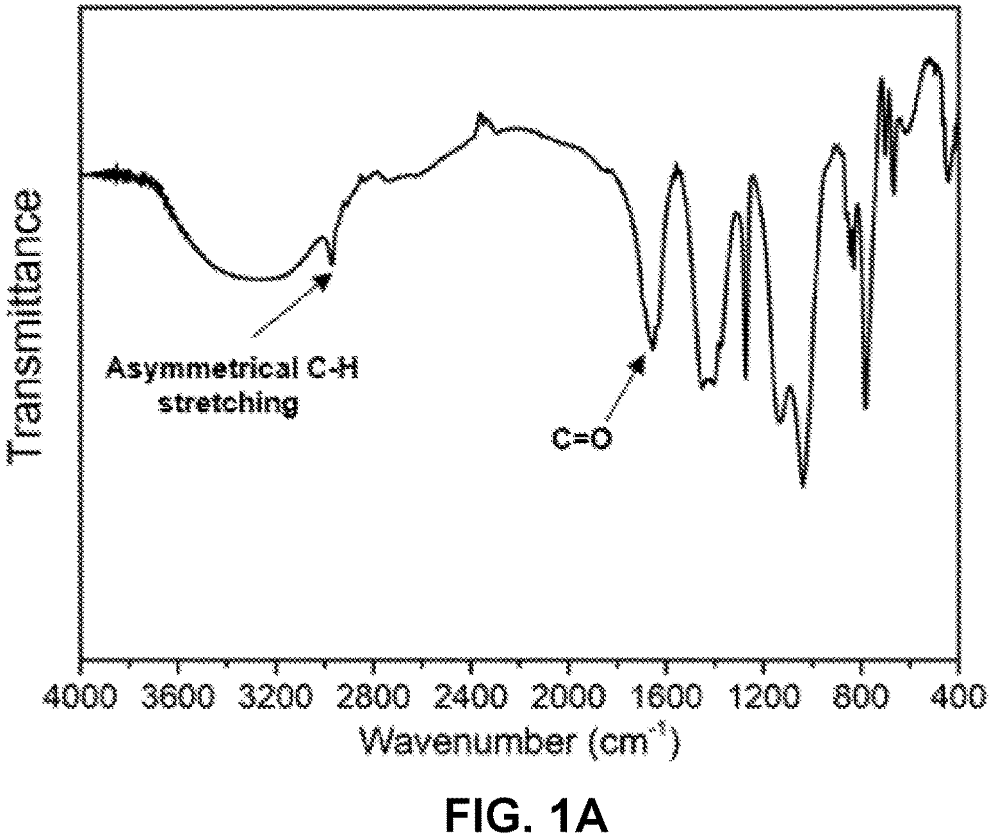
FIG. 1A shows chemical bonds/groups of PMS-based sealers from 400 $cm^{-1}$ up to 4000 $cm^{-1}$.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

GENERAL DESCRIPTION

The disclosed embodiments herein utilize novel sealers and methodologies, preferably dual-nano-engineered PMS sealer compositions and methodologies, to enhance the integrity and durability of underlying concrete structures. The admixed nanomaterials, e.g., graphene oxide (GO) and a nanoclay (NC), often a montmorillonite nanoclay, modifies the base scaler (e.g., the potassium methyl siliconate (PMS) sealer) and surprisingly and unexpectedly synergistically improves its hydrophobicity and thus engineering performance.

It is also to be appreciated that while the admixed nanomaterials, i.e., graphene oxide and montmorillonite nanoclay are preferred, it is also to be appreciated that other nanomaterials can also be utilized where appropriate. For example, nanomaterials, such as, for example, a halloysite clay, a graphene-derived material, a graphene, a reduced graphene oxide, . . . , a surface functionalized graphene, a zirconium phosphate, a layered double hydroxide (LDH), a nano-fiber, a nano-silica, a nano-hydraulic cement, a carbon nano-tube, a carbon nano-fiber, a nano-cellulose, a cellulose nano-crystal, a cellulose nano-fiber, a bacterial nano-cellulose, a chitin, a nano-iron oxide, a nano-carbonate, a nano-boron, a nano-alumina, a C-S-H (calcium silica hydrate), a C-A-S-H (calcium alumina silica hydrate), a C-S-H/C-A-S-H incorporating Na/K, a nano-titania, a metal-organic framework (MOF), a MXenes, a nano/micro hybrid fly ash, a nano/micro hybrid silica fume, a nano/micro hybrid slag, and a nano/micro hybrid kaolin can also be incorporated without departing from the spirit and scope of the invention.

The mortar specimens coated with the 0.15%-by-weight NC þ 0.06%-by-weight GO þ PMS hybrid (15N-6G-P) sealer had the best performance, including a water contact angle of at least 120° The hydrophobic properties of the original sealer was significantly improved by incorporating the nanomaterials due to the replacement of hydrophilic groups (—OH) by hydrophobic groups (—CH3) and changes in the micro-/nano-roughness of the sealed specimens induced by the admixed nanomaterials. The admixed nanomaterials also refined the pores of the cementitious mortar, and the NC reacted with the alkaline PMS sealer to produce more hydrates (K-A-S-H gel), further benefiting the mortar substrate. Accordingly, such a dual-nano-engineered PMS sealer utilized for treating the surface of concrete structures results in achieving lower water absorption, lower gas permeability, and better resistance to salt scaling of concrete structure structures.

SPECIFIC DESCRIPTION

Materials

Mortar Samples:

In demonstrating reduction to practice of embodiments, example mortar samples utilized were prepared with cement, for example, type I/II Portland cement and other materials including, for example, class C fly ash, fine aggregate, and other chemical additives. Generally, the intended applications of the sealer disclosed herein is directed to concrete foundations, piles, piers, tunnels, pavements, bridge decks, and other components or structures made up of concrete or mortar or a combination of concrete and mortar. Mortar was chosen for the embodiments herein, instead of concrete for simplicity in order to focus on the interaction of the sealer with the relatively homogenous cementitious phase, avoiding potential variations introduced by the coarse aggregate phase and the effects of the interfacial transition zone of coarse aggregate on measurements of water absorption, gas permeability, and salt-scaling resistance.

The example chemical composition of the cement and the class C fly ash were examined by X-ray fluorescence (XRF) and are as listed in Table 1 below, wherein LOI=Loss of ignition of cement and fly ash was evaluated by following the Standard Test Methods for Loss on ignition of Solid Combustion Residues.

TABLE 1

| Chemical Composition | $SiO_2$ | $Al_2O_3$ | CaO | $Fe_2O_3$ | MgO | $Na_2O$ | $K_2O$ | $SO_3$ | LOI |
|---|---|---|---|---|---|---|---|---|---|
| Cement | 20.44 | 3.97 | 62.90 | 4.07 | 2.42 | 0.37 | 0.43 | 2.60 | 2.7 |
| Fly ash | 28.62 | 16.75 | 28.13 | 5.84 | 5.12 | 7.67 | 0.42 | 7.22 | 1.5 |

Other chemical beneficial reagents such as a high-range water reducer (HRWR), an air-entraining admixture (AE), triethanolamine (TEA) etc., are often, but not necessarily employed to guarantee the performance of fresh/hardened mortar samples by ensuring workability, improving frost resistance, and enhancing early-age strength of the mortar samples, respectively.

Figure 1B:
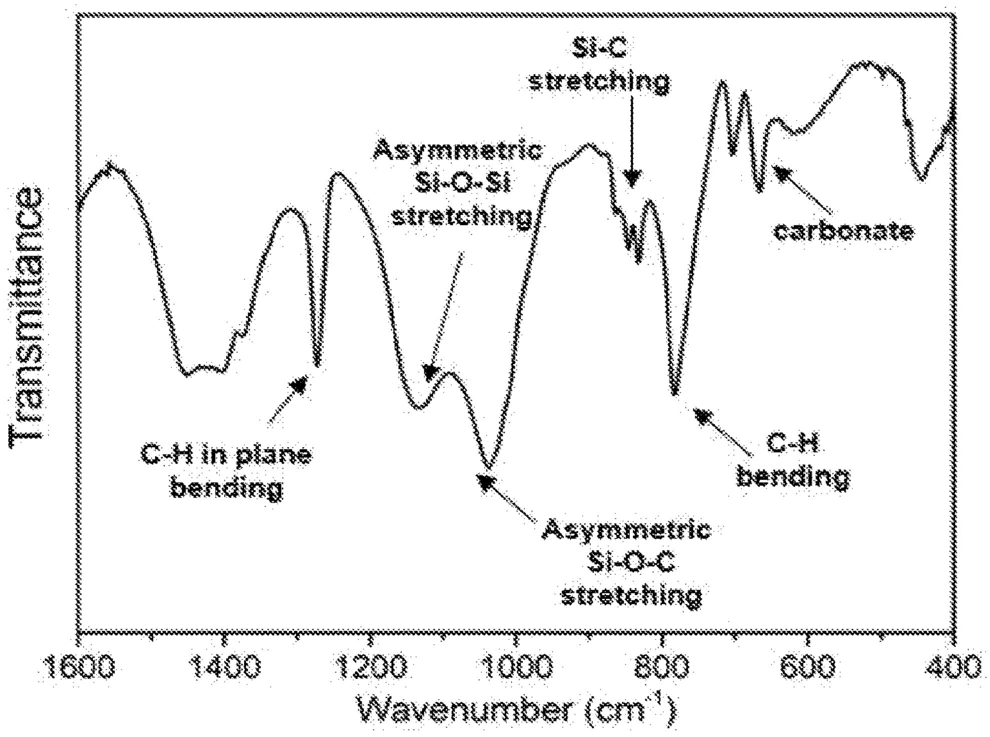
FIG. 1B shows chemical bonds/groups of PMS-based sealers from 400 $cm^{-1}$ up to 1600 $cm^{-1}$.

Sealer:

Example beneficial sealers that can be utilized herein, include, but are not limited to, a potassium methyl siliconate, a sodium methyl siliconate, a lithium silicate, a potassium silicate containing silane/siloxane/silyl ether, a sodium silicate containing silane/siloxane/silyl ether, a lithium silicate containing silane/siloxane/silyl ether, a silane/siloxane/silyl ether resin, an emulsified asphalt, an epoxy resin, a polyester, a polyurethane, a polymethyl methacrylate siloxane, and a thermosetting resin. In the embodiments herein, the beneficial example sealer utilized to treat the surface of the mortar samples is PS101 siliconate multisurface WB penetrating sealer. The composition of this commercial sealer is a potassium methyl siliconate (PMS)/siloxane resin hybrid. While such a composition is beneficial as disclosed herein, it is to be appreciated that other sealers that comports to the invention herein can also be utilized without departing from the spirit and scope of the invention. Nonetheless, the main chemical bonds of the (PMS)/siloxane resin hybrid sealer used to demonstrate the invention are —CH, Si—O—Si, C═O, Si—O—C, and Si—C as represented by the FTIR results in FIG. 1A and FIG. 1B. The presence of the carbonate part of the spectra (see FIG. 1B) likely resulted from the reaction of the sealer with airborne $CO_2$ during the preparation of the sample for FTIR.

Nanomaterials:

In the beneficial example embodiment herein, the sealer utilized was nano-modified to enhance its engineering performance. Often, but not necessarily, one or more nanomaterials can be used to modify the sealer. Example beneficial nanomaterials that can be utilized to nano-modify the sealers include, but are not limited to, a montmorillonite or a halloysite clay, a graphene-derived material, a graphene, a reduced graphene oxide, a graphene oxide, a surface functionalized graphene, a zirconium phosphate, a layered double hydroxide (LDH), a nano-fiber, a nano-silica, a nano-hydraulic cement, a carbon nano-tube, a carbon nanofiber, a nano-cellulose, a cellulose nano-crystal, a cellulose nano-fiber, a bacterial nano-cellulose, a chitin, a nano-iron oxide, a nano-carbonate, a nano-boron, a nano-alumina, a C-S-H (calcium silica hydrate), a C-A-S-H (calcium alumina silica hydrate), a C-S-H/C-A-S-H incorporating Na/K, a nano-titania, a metal-organic framework (MOF), a MXenes, a nano/micro hybrid fly ash, a nano/micro hybrid silica fume, a nano/micro hybrid slag, and a nano/micro hybrid kaolin.

To illustrate the beneficial example embodiments herein, the PMS-based sealer was dual-nano-modified i.e., two nanomaterials were used to modify the PMS-based sealer. The two nanomaterials selected herein to provide example working embodiments were 2D nanomaterials generally configured with traverse dimensions larger than 100 nm and thickness typically less than 5 nm. They can be further broken down as nanoplatelets with a thickness of few nanometers. Such nanoplatelets have increased tortuosity that helps reduce the ingress of water and other solutions into the surface that is treated with the nanoplatelets or in the embodiments herein, treated with the sealer modified with such nanomaterials.

A beneficial first nanomaterial selected was Graphene oxide (GO), a 2D nanomaterial with a lateral size distribution ranging from 4 to 20 microns. GO was prepared by following the modified Hummers method, known to those skilled in the art. The main chemical element proportion of the GO utilized herein was 71% by weight carbon and 26% by weight oxygen, as revealed by energy-dispersive X-ray (EDX) spectroscopy. FTIR analysis detected several chemical bonds including O—H, C—H, C—O, C═C, and C═O. The GO has a zeta potential of −30 mV in a pH-neutral aqueous solution, indicative of the high amount of the negative charges on the well-dispersed GO nanoplatelets. The second example 2D nanomaterial utilized for the embodiments herein was Na-montmorillonite nanoclay (NC). The NC used herein comprised of nanosheets with a negative charge and a bulk density of 0.678 $g/cm^3$, and an aspect ratio of 200-400. The chemical structure was a layer of Al—O octahedrons sandwiched by two layers of Si—O tetrahedrons, and it has pozzolanic reactivity.

Preparation of Nanomodified Sealers:

In an example method of operation, a nanomodified PMS sealer suspension was prepared with the assistance of a Branson S-450D digital sonifier (400 W, 60% amplitude). To prepare the nanomodified PMS sealer suspension, firstly the two nanomaterials to be utilized, for example, GO and NC were precisely measured and secondly blended with the sample sealer, such as, for example, PMS-based sealer product. As a next step, for up to about 30 minutes, ultrasonic dispersion was performed on the blended mixture of nanomaterials and PMS-based sealer to obtain a well-dispersed nanomodified PMS sealer suspension.

For the example embodiments herein, GO was used in a range of dosages, such as, for example, from 0.015% up to about 0.15% (specifically, 0.015%, 0.03%, 0.06%, 0.1%, and 0.15%) by the mass of the PMS sealer and denoted as 1.5G, 3G, 6G, 10G, and 15G with respect to the specific dosages.

Based on the water contact angle results, 0.06% by weight GO appeared as an optimal dosage for the GO-modified PMS sealer as well as for the GO-modified PMS sealer incorporating 0.1% by weight NC. Thus, because of the water contact angle results and weighted also by cost analysis, the 6G-PMS sealer was a beneficial choice for utilization but is not to be strictly limited to this particular composition and using this illustrative sealer, NC was introduced in a range of dosages from 0.015% up to about 0.15% (specifically, 0.015%, 0.03%, 0.06%, 0.1%, and 0.15%) by the mass of the PMS sealer and denoted as 1.5N-6G-P, 3N-6G-P, 6N-6G-P, 10N-6G-P, and 15N-6G-P with respect to the specific dosages.

It is also to be appreciated that in practice of the invention, the two nanomaterials used in the example embodiments herein can be utilized for the modification of a sealer in any order of usage in a method of operation, i.e., GO can be used to modify the sealer and then add NC to the GO-modified sealer or NC can be used to modify the sealer and then add GO to the NC modified sealer. The two nanomaterials can also be admixed together as a combination of two nanomaterials to further modify the sealer. These versatile combinations of the nanomaterials allow cost-effective modification of the base sealer component.

Fabrication of Fly Ash-Cement Mortar Specimens:

In an example method of fabrication, firstly, a laboratory mixer of 12 quarts was employed with Portland cement, class C fly ash, and fine aggregate that were dry blended in the mixer for up to about 1.5 min. The mix proportions of the fly ash-cement mortar specimens utilized is as shown in Table 2 below.

TABLE 2

| Raw materials | Proportion (kg/m$^3$) |
|---|---|
| Cement | 482 |
| Fly ash | 82 |
| Water | 206 |
| TEA | 0.32 |
| Fine aggregate | 1,545 |
| Air-entraining admixture | 0.13 |
| High-range water reducer (HRWR) | 4 |

Secondly, a solution was prepared by dissolving TEA, AE, and HRWR together at the same time. The solution was then directly poured into the dry mixture and mixed for another 1.5 min. After mixing, the fresh mortar mixture, with 4.4% air content, was cast into 5×10-cm (diameter× height) cylinder molds. All the specimens were demolded after curing under room temperature conditions for 24 h, then moved and cured in a standard curing environment (22° C.±2° C. with a relative humidity of 95%±3%) for an additional 27 days for further treatment and testing.

Coating PMS and Nanomodified PMS Sealer:

In the embodiments disclosed herein, the original PMS sealer and the nanomodified PMS sealer was sprayed onto the surface of the cementitious mortar samples and dried in the air for 2 h to guarantee the full reaction between airborne $CO_2$ and the PMS. It is to be noted that while spraying (coating) was the applying process used herein, other applying processes for the sealer is also applicable as known in the art where appropriate, such as, for example brushing, rolling, dipping, and pressure or vacuum injection grouting. In any case, the application rate for spraying for this teaching was 0.136 L/m2 (300 ft$^2$/gallon. The surfaces coated with each of the various PMS sealers were then used for performance tests.

Performance Tests

Water Absorption Test:

The water absorption test was performed following an industry standard to evaluate the water transport properties of the cementitious mortar specimens coated with each of the various PMS sealers disclosed herein. The size of each testing disk specimen was for illustrative purposes, 5×2 cm (diameter×height), cut from the 5×10-cm (diameter×height) mortar cylinders. Before testing, all disk specimens were cured in a sealed chamber (50±2° C. with a relative humidity of 80±3%) for 3 days and then cured at standard curing condition (22±2° C. with a relative humidity of 95±3%) for other 15 days. Before testing, all disk mortar samples were oven-dried at 105° C. for 24 h to remove the residual moisture and then cooled down to room temperature. The top and side surfaces of samples were carefully sealed with a plastic membrane to avoid any water vapor leakage.

The water absorption test was performed by only allowing the bottom surface of the specimen to be in contact with water. Supports were employed to ensure that the level of water was about 1-3 mm above the bottom of the specimens, to guarantee continuous contact between the specimens and water. The mass of each specimen was recorded at fixed time intervals and the absorption coefficient was then calculated using the equation below by linearly fitting the increasing part of the water absorption curve:

$$I = m_t/(a \times b) = k\sqrt{t}$$

where l=water absorption (mm), k=absorption coefficient (mm/t$^{0.5}$), $m_t$=the change of specimen mass in gram at time t, a=the exposed area of the specimen (mm$^2$), b=the density of water ($10^{-3}$ g/mm$^3$), and t=time(s).

Figure 2A:
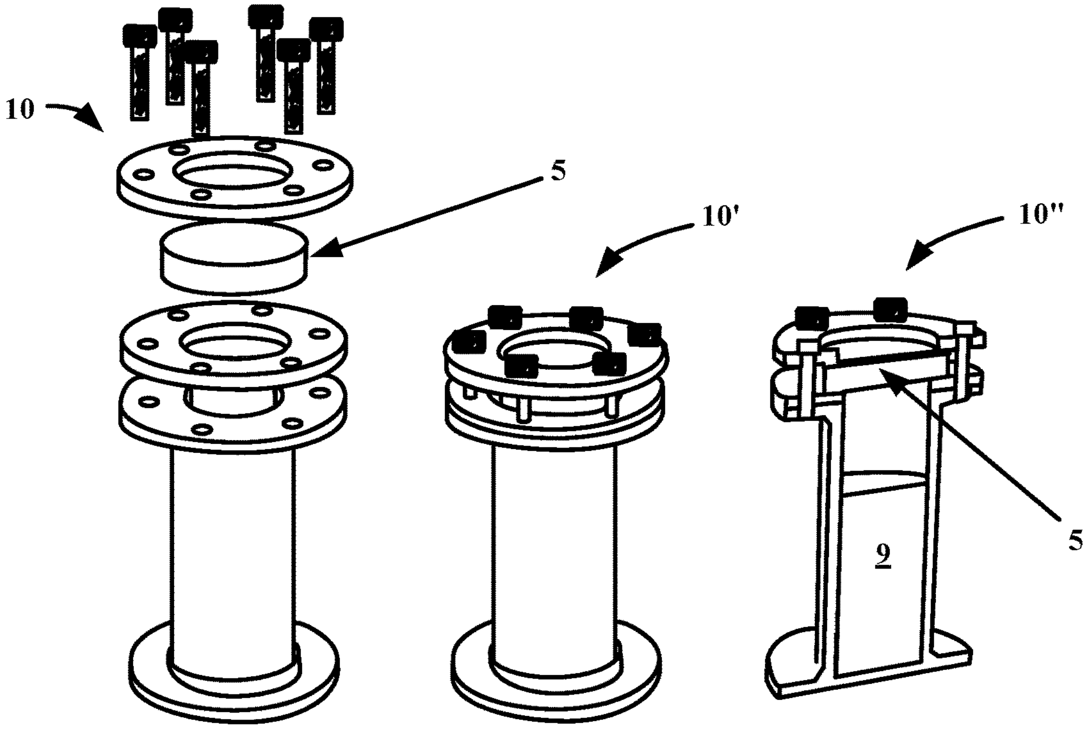
FIG. 2A shows the experimental setup of a gas permeability test.
Figure 2B:
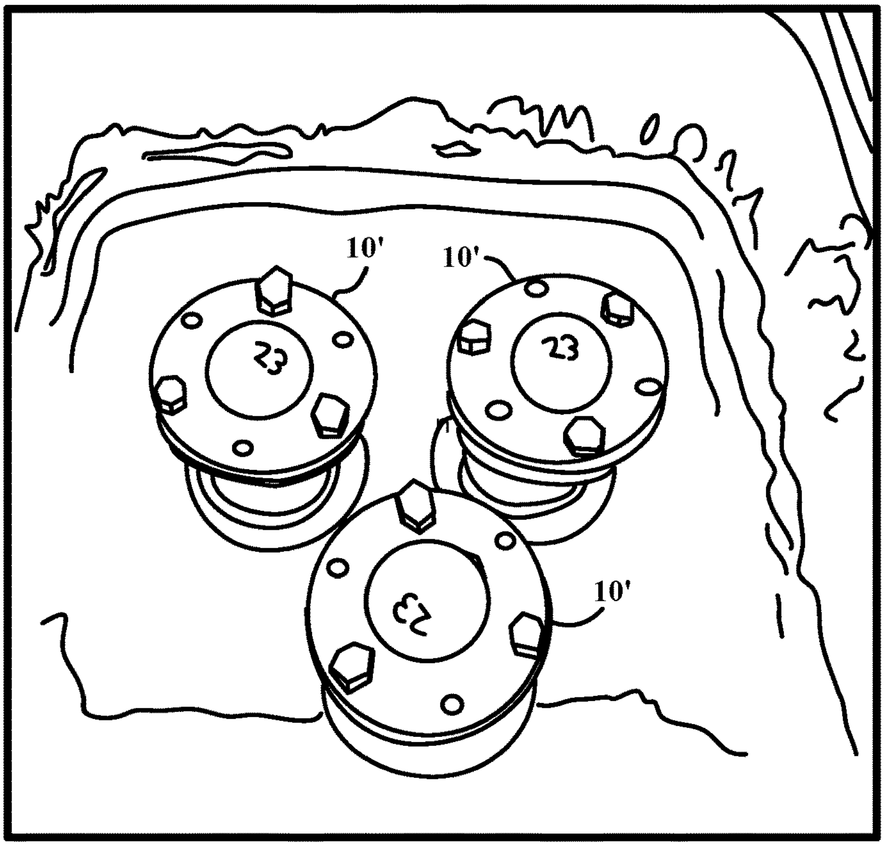
FIG. 2B shows the gas permeability test in progress.

Gas Permeability:

FIG. 2A shows a graphical representation of a test assembly, wherein reference character 10 shows an overall dissembled arrangement, 10' shows the assembled arrangement, and 10" shows a cross-sectional view of the final assembly to give the reader an appreciation for the positional aspects of the mortar specimen 5 and gas source 9 (i.e., liquid methanol), within the assembled cell (e.g., 10', 10"). The gas permeability test was thereafter performed (FIG. 2B shows the experimental arrangement while the test is in progress for a plurality of assemblies 10') to evaluate the permeability of cementitious mortar specimens 5 coated with each of the various PMS-based sealers. Each disk mortar specimen 5, as shown in FIG. 2A, was for illustrative teaching purposes, 5 cm (diameter)×2 cm (height) and was vacuum oven-dried at 60° C. for up to about 72 h to remove the remaining moisture before testing. Then, the disk specimen 5 was placed and sealed on the top of a cell, e.g., 10" as shown in the FIG. 2A with epoxy sealant to avoid any leakage of methanol vapor as seen in FIG. 2A.

The initial weight of the whole final specimen setup including the cell 10", methanol liquid 9, specimen 5, and epoxy sealant was recorded at the beginning of the test. Then the mass loss of the whole setup due to the evaporation of methanol liquid at a constant 40° C. water bath was continuously recorded at each time interval until a steady-state mass loss was obtained. The level of warm water bath was always kept higher than that of the liquid methanol 9 in the cell to guarantee full heating; the temperature of water bath should not exceed the boiling point of methanol (~64.7° C.) and the level of liquid methanol should not exceed half-height of the cell to avoid any absorption of methanol by the mortar sample . . . .

Based on the mass loss and other physical parameters, the gas permeability coefficient k (m$^2$/s) was calculated by using the following equations:

$$pv = 10^{([8.0809-1582.2/(239.76+T)])}$$

$$\eta = 10^{-7}\left(4.7169T^{0.618} - 99e^{-8.7593(10^{-4T})} + 94e^{-7.916(10^{-3T})} + 5\right)$$

$$Q = \left(266 \times 10^{-3} m' T\right)/(pv)$$

$$k = (2L\eta P_2 Q)/A\left(P_1^2 - P_2^2\right);$$

where: pv is the absolute pressure of vapor (N/m$^2$), T is the absolute temperature (K), η is the dynamic viscosity (N/m$^2$), Q is the volumetric flow rate (m$^3$/s), m' is the rate of mass loss (g/s), $P_1$ is the inlet pressure (N/m$^2$), $P_2$ is the outlet pressure (N/m$^2$), L is the length of the sample (m), A and is the cross-sectional area perpendicular to the flow direction (m$^2$).

Water Contact Angle and Surface Free Energy Tests:

The water contact angle (a.k.a., static contact angle as known in the art) is a beneficial parameter of characterizing the hydrophobicity or hydrophilicity of materials, and the surface free energy of materials that can be evaluated from the water contact angle value. These parameters are utilized for characterizing a sealer material and have a decisive influence on the wettability of the cementitious surface. Test equipment was employed to using standard practices for analyzing the surface wettability of coatings, substrates, and pigments by advancing contact angle measurements. To minimize potential inaccuracy induced by the unsmooth texture and pores of the mortar substrate, a glass slide was used to replace the mortar sample to run this test. After a water droplet contacted the surface of the glass slide that was coated with a given PMS-based sealer for 5 seconds, a picture was captured to measure the water contact angle. Values from three measurements were averaged as the final result. Based on the water contact angle, the surface free energy (γsv) (the quantitative measure of the intermolecular forces at the surface which is independent of the liquid used) was calculated using the following formula:

$$W_A = \gamma_{lv}(1 + \cos\theta)$$

$$W_A = 2(\gamma_{lv}\gamma_{sv})^{0.5}\left[-(\gamma_{lv} - \gamma_{sv})^2\right]$$

where: $W_A$ is the work of adhesion (mJ/m$^2$), $\gamma_{lv}$ is the surface tension of water (71.97 mJ/m$^2$ at 25° C.), θ is the water contact angle (°), and β is a constant of 0.0001247 ((mJ/m$^2$)$^{-2}$).

Salt-Scaling Test:

In order to simulate the harsh service environment experienced by concrete in cold regions, a combination of freeze/thaw in addition to dry/wet (F/T+D/W) cyclic action was performed in a salt brine. This action was performed in an accelerated fashion to simulate the rapid freezing rate. As a pre-step, before the initiation of the F/T+D/W cycles, all cementitious mortar samples, including that with and without the PMS-based sealers were immersed in a plastic box containing a 3.5%-by-weight NaCl solution for 24 h in order to saturate the mortar pores. All the samples were then placed into a freezer for 14 h at about-20° C. to initiate the repetitive F/T+W/D cycles.

Subsequently, the samples in the plastic box were moved to the laboratory environment maintained at 23° C.±1.7° C. with a relative humidity ranging from 45% to 55%, until the ice in the plastic box was completely thawed; then, the samples were transferred into the oven and vacuum-dried at 40° C. for 4 h to finish one cycle. This F/T+W/D cycle was repeated eight times in the example embodiment herein. The masses of the samples before and after the final cycle were recorded and the surface scaling depth was measured only after the final cycle.

Viscosity of PMS-Based Sealers with/without Nanomodification:

A commercial Rheometer was employed to evaluate the influence of GO and NC on the viscosity of the PMS-based sealers. Four sealer samples were tested in the example embodiments herein including the original (PMS-based sealer), 6G (PMS-based sealer modified with 0.06% of GO), 15N (PMS-based sealer modified with 0.15% of NC), and 6G-15N (PMS-based sealer modified with 0.06% GO and 0.15% of NC), respectively. For this test, the sensor force was set as 0.02N, the initial shear rate was 0.01/s, and the final shear rate was 100/s.

Figure 3A:
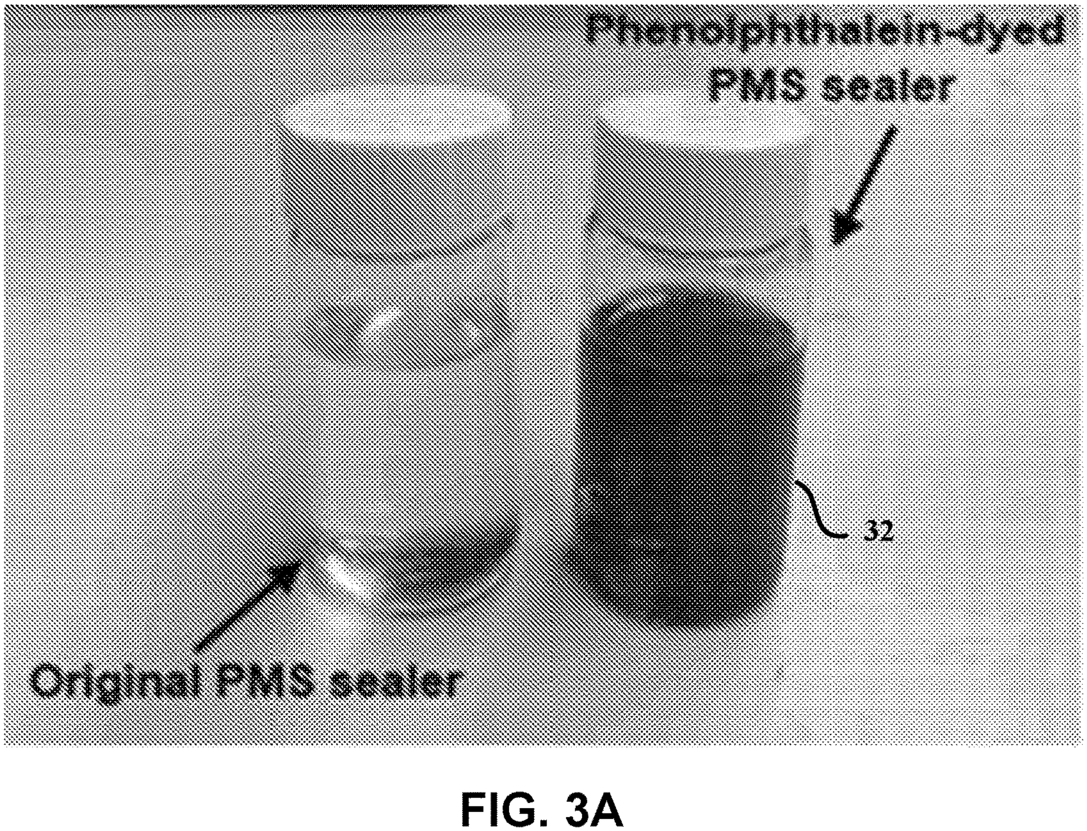
FIG. 3A shows an original PMS-based sealer and a phenolphthalein-dyed PMS-based sealer.

Penetration Depth of Various PMS Sealers:

The penetration depth of various PMS-based sealers in cementitious mortar specimens was measured herein by a reading microscope configured with 0.005 mm resolution. Phenolphthalein was employed to color dye 32 the alkaline PMS-based sealer, as shown in FIG. 3A, enabling the penetration depth to be easily detected by tracing the black colored footprint, indicated as penetration depth 34 (also denoted by double arrows) in FIG. 3B. To minimize the measurement error, the penetration depth at 10 points with 4 mm spacing were collected, and one-way analysis of variance (ANOVA) was conducted to distinguish the statistical difference in the penetration depth between mortar specimens coated with different sealers.

High-Resolution Optical Microscope:

A commercial optical microscope with a high resolution of 2000× was employed to illustrate the scaling depth of mortar samples coated with each sealer. All cementitious mortar samples were gradually polished to 5,000 meshes (about 2.6 μm) before the cyclic-scaling action so as to avoid the great roughness generated by the original cutting facet. These polished samples were coated with different sealers, and then the salt-scaling process was started. Before optical microscope analysis, these aged mortar samples were dried in the oven at 50° C. for up to about 4 h to remove visible moisture in order to avoid any measurement errors induced by reflected light from water. Higher temperatures were avoided to mitigate secondary thermal cracks. A strong gas dryer and absorbent paper were also avoided to prevent growth of the scaling.

Thermogravimetric Analysis:

Thermogravimetric analysis (TGA) was conducted to investigate the thermal stability of the original and selected beneficial nano-modified PMS-based sealers. Derivative thermogravimetry (DTG) was also conducted to detect the potential pozzolanic reaction between the NC and the alkaline PMS-based sealer, as well as other phase changes between different sealers. Herein, the initial and final temperatures of TGA/DTG were set at 50° C. and 500° C., respectively, and the heating rate selected was 10° C./min.

Performance Test Results

The mortar specimens coated with the 0.15%-by-weight NC+0.06%-by-weight GO+ PMS hybrid denoted as 15N-6G-P sealer provided novel beneficial performance results, as disclosed in detail herein.

Figure 4A:
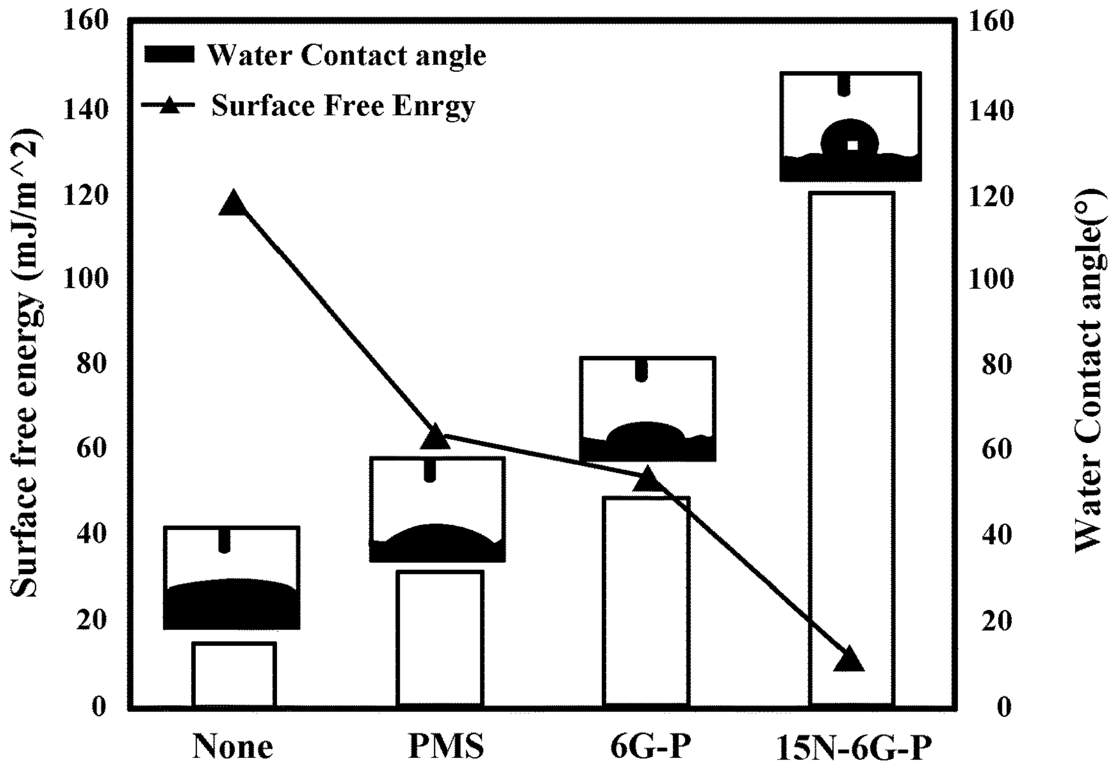
FIG. 4A shows the water contact angle and surface free energy values of the representative glass slide sample with no sealer, PMS, 6G-P, or 15N-6G-P sealer.
Figure 4B:
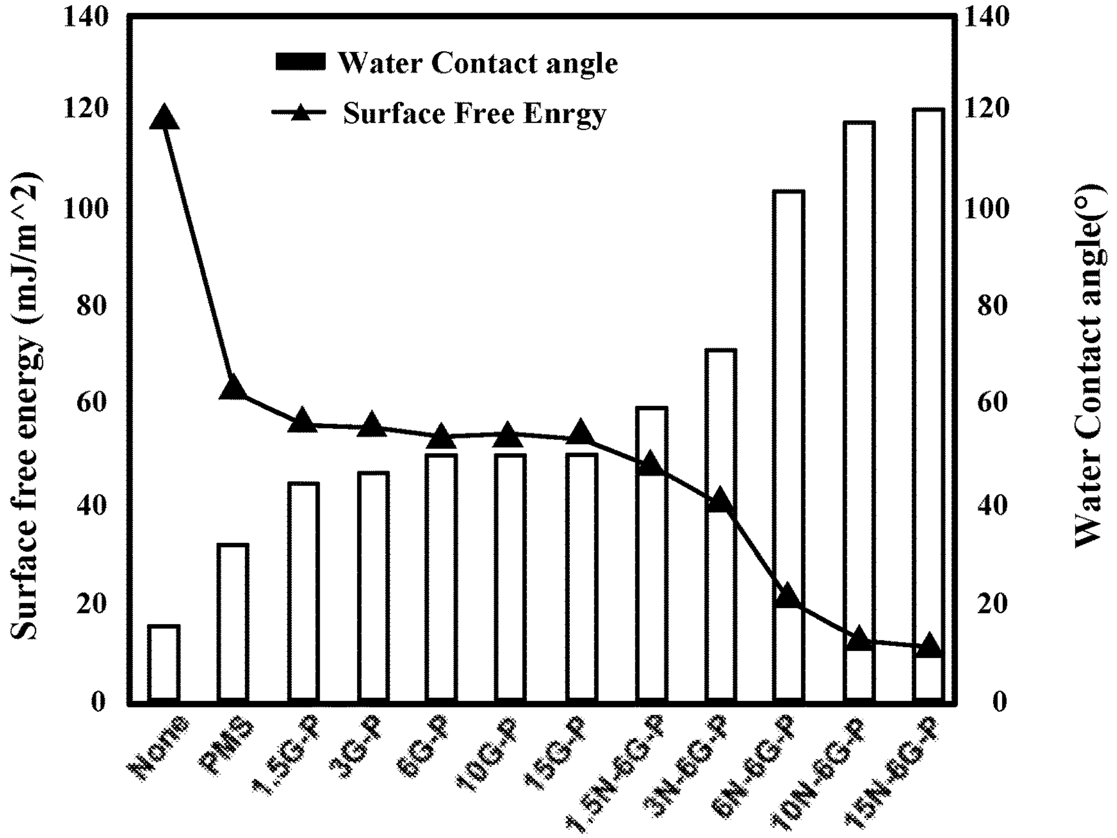
FIG. 4B shows the water contact angle and surface free energy values of the various PMS-based sealer coated glass slide samples.

Hydrophilicity of Treated Surface:

The PMS sealer and its admixed nanomaterials i.e., GO and NC, effectively reduced the hydrophilicity and decreased the surface free energy of the PMS sealer membranes, especially with the synergistic use of GO and NC as can be seen in FIG. 4A and FIG. 4B. Each sealer was used to coat a glass slide (as briefly mentioned above) instead of a mortar sample in order to minimize the potential influence of the surface roughness of mortar samples for the example embodiments herein. The water contact angle of the PMS sealer samples, each modified in different nanomaterial dosages was thereafter measured. The surface free energy was then consequently calculated based on the water contact angle.

As shown in FIG. 4A, the representative water contact angles of a blank glass slide (with no sealer) and glass slides coated with original PMS sealer were about 15° and 32°, respectively. After admixing 0.06% by weight GO, the water contact angle increased to 48°. Surprisingly and unexpectedly, the synergistic use of 0.06% by weight GO and 0.15% by weight NC (i.e., sample 15N-6G-P) further increased the water contact angle to at least 120°. Thus, the synergistic use of GO and NC surprisingly and unexpectedly increased the hydrophobicity in the sealer treated surface.

Correspondingly, the surface free energy, as shown in FIG. 4A but is best illustrated by the variety of tested materials shown in FIG. 4B, shows a decrease (note again sample 15N-6G-P, but other samples as well) upon nano-modification. The increased hydrophobicity or decreased surface free energy are a result of several mechanisms which are interdependent. One of the main reasons is due to the changes in the surficial chemical groups that the synergistic use of GO and NC introduce on the PMS-based sealer.

Figure 5A:
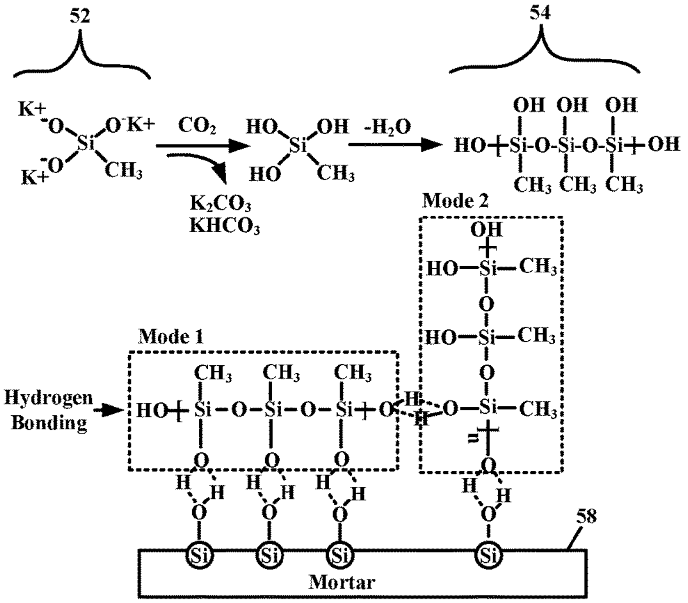
FIG. 5A shows the reaction mechanism of PMS-based sealers.
Figure 5B:
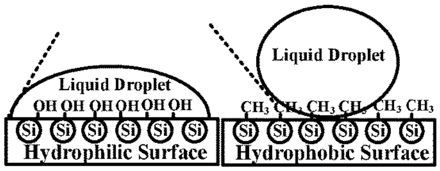
FIG. 5B shows the diagrammatic relationship between water contact angle and surficial chemical groups.

The top of FIG. 5A shows the chemical reactions to provide methyl-silicone membranes 54. Accordingly, after being sprayed on a mortar surface, the PMS 52 to provide the dual-nano-modified PMS-based sealer, reacted with $CO_2$ and generated $KHCO_3$, $K_2CO_3$, as also shown in FIG. 5A so as to result in methyl-silicone membranes 54. The membranes 54 include two types of grafting modes represented as Mode 1 and Mode 2 in FIG. 5A. Such membranes 54 in addition to GO and NC additives, are coupled with the mortar specimen surface 58 via strong hydrogen bonding. These membranes 54 replace hydrophilic-OH groups on the surface of the cementitious composite with hydrophobic —$CH_3$ groups, as shown in FIG. 5B, so as to configure a hydrophobic layer on the surface that inhibits water sorption.

Figure 5C:
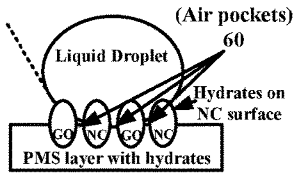
FIG. 5C shows the diagrammatic relationship between a water contact angle and a nano-roughness and with hydrates.
Figure 5D:
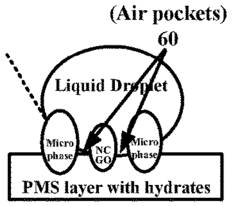
FIG. 5D shows micro-/nano-roughness resultant structure.

Moreover, GO/NC additives, not only modified the sealer's chemistry and increased hydrophobicity, but also results in a nano-roughness on the surface treated by the scaler. In particular, air pockets 60, as shown in FIG. 5C and FIG. 5D, become trapped in solid nanocavities (not denoted), leading to a complex solid (nanomaterials)-liquid (water droplet)-air interface. FIG. 5C thus generally illustrates this morphology, wherein the difficulty for the treated surface to be fully wetted is due to an increased water contact angle. Moreover, FIG. 5C also generally shows hydrates on the NC surface. Thus, the nanomaterials bonded sequentially or simultaneously to the sealer, also refined the pores of the cementitious mortar, and the NC reacted with the alkaline PMS sealer to produce more hydrates (K-A-S-H gel), further benefiting the mortar substrate.

In addition, the introduction of GO and NC jointly provides the formation of a rough nano-/micro-scale hierarchical structure due to agglomeration of nanomaterials so as to further induce hydrophobicity. Specifically, this effect can be attributed to the micro-/nano-roughness induced by the random assembly of microphase (agglomerated nanomaterials) and nanophase (dispersed nanomaterials), which is also generally illustrated by FIG. 5D.

Lastly, negative charges introduced by NC/GO platelets and the reassembly of nanomodified PMS monomers can alter the intermolecular forces on the sealer-coated cementitious mortar surface, contributing to the decrease of its surface free energy. This mechanism can be interpreted as alternations to the polymerization processes: the template regulation effect of negatively charged nanosheets (NC and GO) induced the generation of layer-by-layer potassium-based components, and the pozzolanic reaction between NC and KOH resulted in potassium aluminum silicate hydrate (K-A-S-H) gel (confirmed by TG analysis subsequently); both of these processes modified the original components on the mortar surface.

Figure 6A:
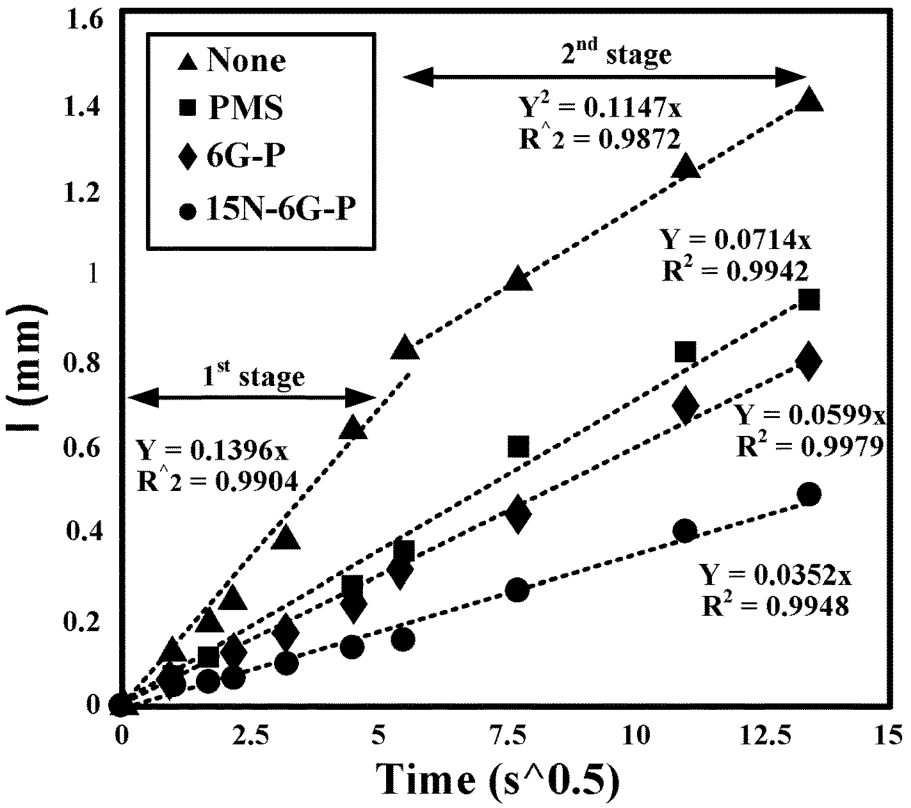
FIG. 6A shows the water absorption coefficient of representative mortar specimens with no sealer, PMS, 6G-P, and 15N-G-P sealers.
Figure 6B:
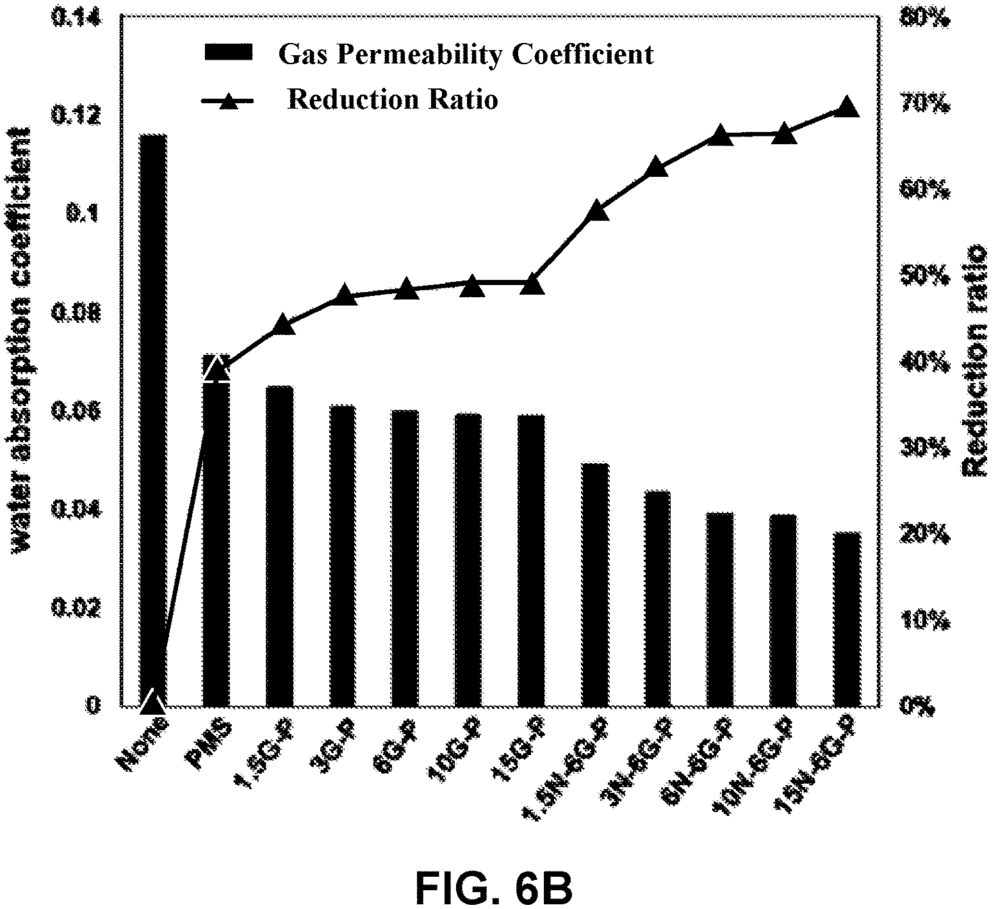
FIG. 6B shows water absorption coefficient versus corresponding reduction ratio of mortar samples coated with various sealers.

Water Absorption of Treated Surface:

The PMS sealer and its admixed nanomaterials effectively reduced the water absorption of the sealed mortar specimens, with the 15N-6G-P sealer being the best, but not the only beneficial composition, as disclosed herein. FIG. 6A and FIG. 6B show the water absorption behavior of mortar specimens coated with PMS sealers that have been modified with various dosages of nanomaterials. The water absorption coefficient is a crucial characteristic, as known to those of ordinary skill in the art, which has been extensively employed to assess the vulnerability of cementitious composites, because most durability distresses would not occur without the ingress of external water molecules. The higher the water absorption coefficient is, the more vulnerable the cementitious composite is in its service environment.

Turning to FIG. 6A, the water absorption coefficient k was computed by linearly fitting the continuous increment part, and the representative k values of original mortar samples and mortar samples coated with PMS, 6G-P, and 15N-6G-P sealers were 0.1162, 0.0714, 0.0599, and 0.0352 mm, respectively. In addition, the k values of mortar samples coated by various PMS sealers versus the corresponding reduction ratio is as shown in FIG. 6B for a more visual comparison. For instance, the application of the original PMS-based sealer and 6G-P and 15N-6GP, decreased the k values of the mortar surface by 39% and 48%, respectively. Surprisingly and unexpectedly, the synergistic effect of use of GO and NC, as shown by sample 15N-6G-P decreased the k value of mortar surface by at least 70%. The admixed nanomaterials acted as nanofiller, hydration participant, and hydration template to produce compounds that refined the pore structure of cementitious composites, blocking or refining their transport tunnels.

In addition, the increased hydrophobicity of the nano-modified-sealer treated surface also plays a crucial role in the reduction in the water sorptivity of the treated mortar. A mortar surface with higher hydrophobicity and lower surface free energy tends to absorb less water. There was a significant difference between the initial and secondary water sorption stages of normal mortar samples. However, no obvious secondary water sorption was observed in mortar samples coated with sealers. Thus, the application of the PMS sealer disclosed herein endowed the mortar specimens with effective protection, and it took a much longer time for water to migrate and fill their capillary pores (i.e., to complete the first stage of water absorption). Consequently, during the tests disclosed herein, the sealed mortar specimens did not enter the second stage of water absorption (i.e., the filling of air voids).

Figure 7:
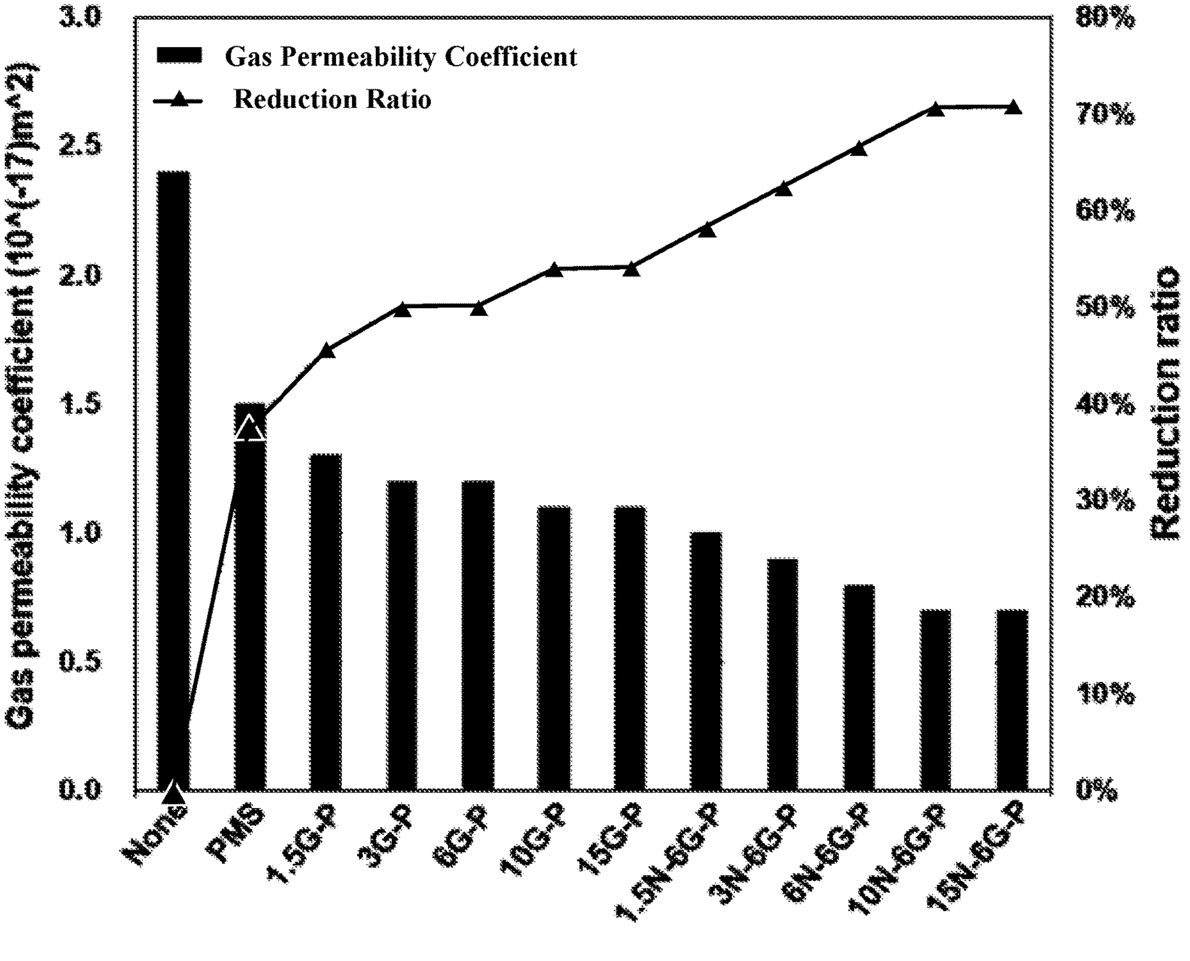
FIG. 7 shows the gas permeability coefficient vs. the corresponding reduction ratio of mortar samples coated with various sealers.

Gas Permeability of Treated Surface:

The PMS sealer and its admixed nanomaterials effectively reduced the gas permeability of the sealed mortar specimens, with the 15N-6G-P sealer being the best, but not only beneficial composition, as shown in FIG. 7. Specifically, FIG. 7 shows the gas permeability of mortar specimens coated with various PMS sealers. For instance, the application of the original PMS-based sealer, 6G-P, and 15N-6G-P decreased the gas permeability coefficients of the mortar surface by 38%, 54%, and 71%, respectively. The nanomaterials resulted in a denser microstructure of the cementitious surface as understood from the results of the water absorption and gas permeability tests. The results disclosed herein thus beneficially show that the admixed nanomaterials helped slow down the penetration of gaseous phases through the cementitious surface.

Figure 8A:
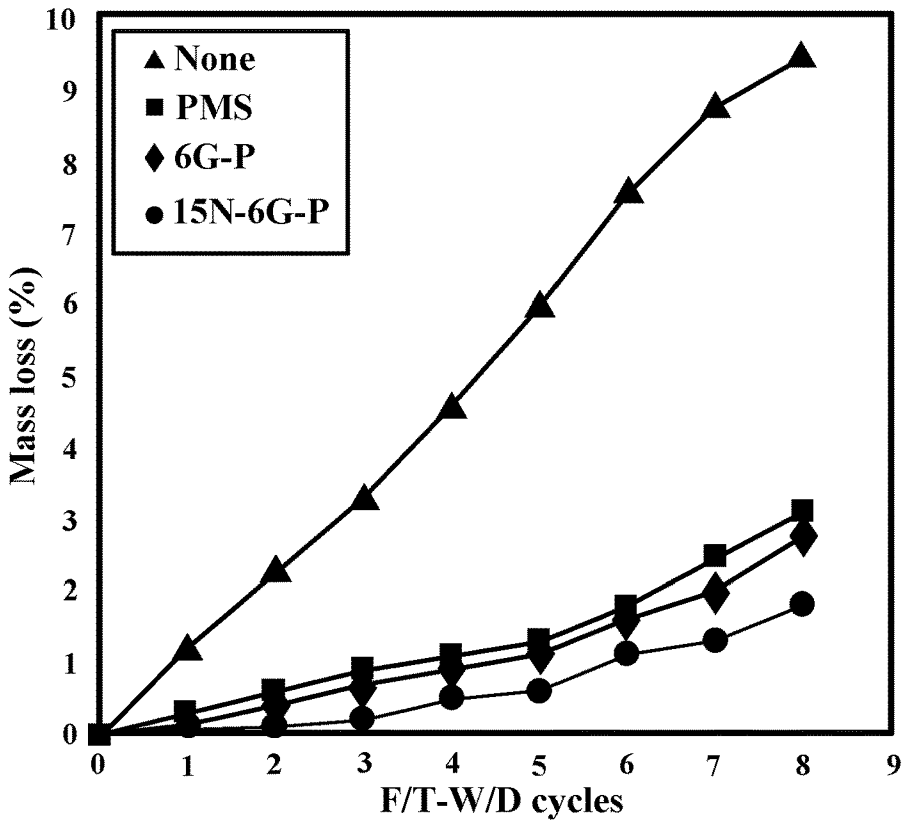
FIG. 8A shows the mass loss of mortar specimens with none, PMS, 6G-P, and 15N-6G-P sealers after 8 F/T+W/D cycles.
Figure 8B:
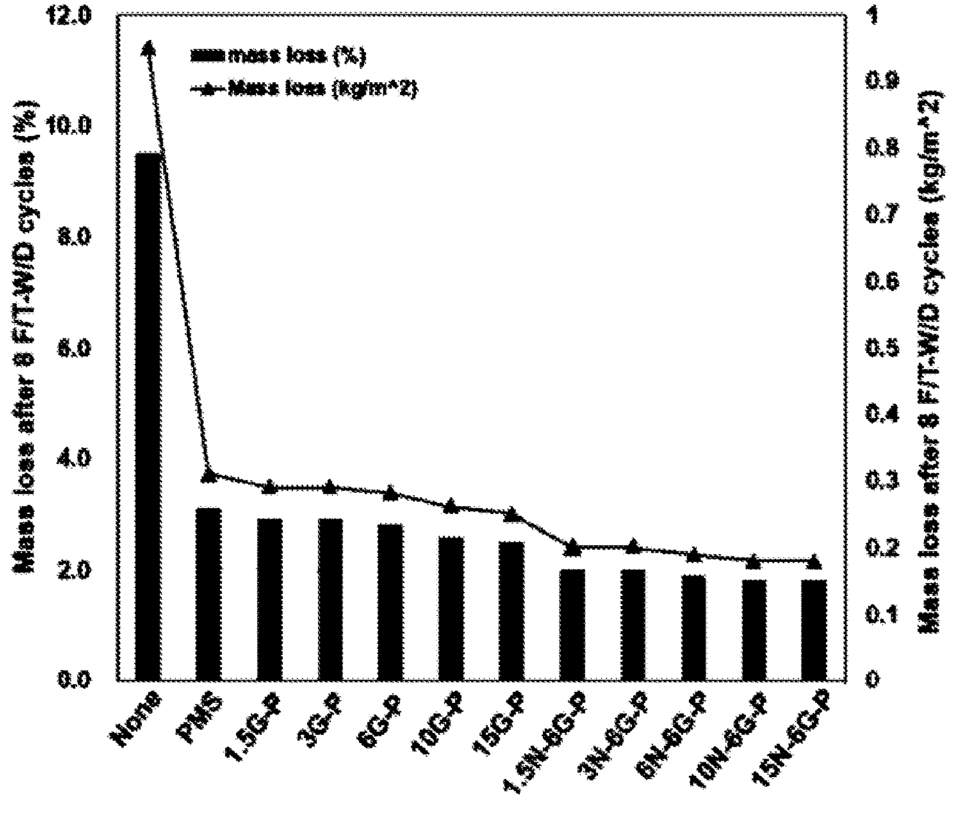
FIG. 8B shows the mass loss of all mortar samples coated with various sealers.

Salt-Scaling Resistance of Treated Surface:

FIG. 8A and FIG. 8B show the salt-scaling behavior of mortar specimens coated with various PMS sealers, evaluated by measuring the mass loss after F/T+D/W cycles. After eight cycles of F/T+D/W, the average mass loss of no-sealer mortar specimens was approximately 9.5%, while the mass loss of mortar specimens coated with PMS, 6G-P, and 15N-6G-P scaler was about 3.0%, 2.7%, and 1.9%, respectively. Thus, the PMS sealer and its admixed nanomaterials effectively improved the salt-scaling resistance of the sealed mortar specimens, with the 15N-6G-P sealer being most desirable as a product composition.

Figure 9A:
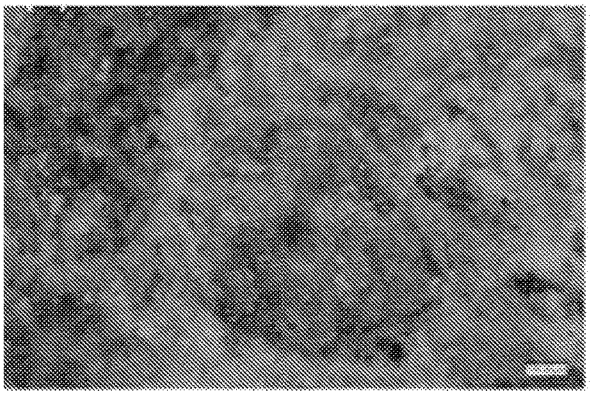
FIG. 9A shows a digital photo of surface scaled mortar samples.
Figure 9B:
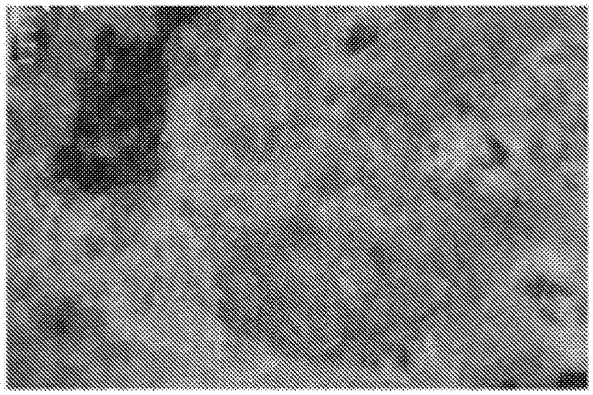
FIG. 9B shows a depth nephogram of surface scaled mortar samples.
Figure 9C:
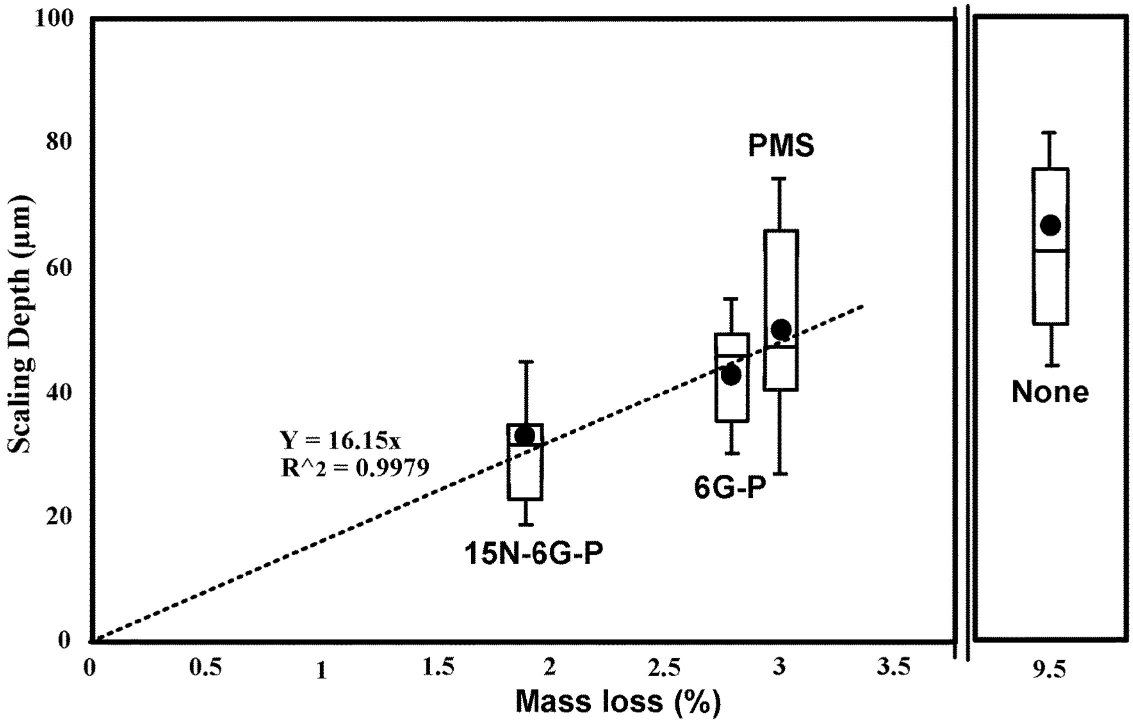
FIG. 9C shows a statistical summary of scaling depth and the linear relationship between scaling depth and mass loss.

FIG. 9A. surface-scaled mortar samples and FIG. 9B shows depth nephograms of surface-scaled mortar samples, while FIG. 9C shows the associated statistical analysis. The scaling depth of the no-sealer mortar specimens was significantly more severe than that of the sealed mortar specimens. Relative to the no-sealer specimens, the average scaling depth of mortar specimens sealed with PMS, 6G-P, and 15N-6G-P was approximately 20%, 32%, and 48% less, respectively. In addition, the scaling depth was more homogeneous for mortar specimens protected by sealers with nanomaterials admixed (15N-6G-P), as shown by the less scatter of values illustrated in FIG. 9C (i.e., as shown in the shorter box). The decreased scaling depth accorded with the reduced mass loss; these two parameters followed a strong linear relationship with high reliability ($R^2$ of 0.9979).

The improvement in salt-scaling resistance can be attributed to two mechanisms of the treated mortar specimens. For the salt-scaling of no-sealer mortar specimens, the mass loss after a given number of F/T+D/W cycles in NaCl solution resulted from a combination of complex physicochemical reactions, including: physical degradation due to F/T attack owing to the internal expansion due to formation of ice crystals and associated stress buildup due to hydraulic or osmotic pressures; physical degradation due to W/D-associated salt crystallization; and chemical degradation by NaCl via calcium leaching and formation of new crystalline phases. With salt-scaling, crystalline expansion of water and chemical attack are the principal culprits responsible for the cracking and spalling of cementitious materials.

Firstly, for the sealed mortar specimen, all these degradation mechanisms were mitigated by limiting the availability of moisture and NaCl to the cement mortar matrix. The decreased water absorption rate of the cementitious mortar due to the hydrophobicity endowed by the PMS-based sealers was the main reason for this. Application of the PMS-based sealers (with or without nanomodification) notably slowed down the ingress of water molecules (and that of NaCl dissolved in water) into the mortar matrix, effectively mitigating both the physical and chemical degradation of the mortar. Secondly, the refinement of the sealed mortar matrix was beneficial to the salt-scaling resistance of the mortar. This refinement was induced by the nanomaterials in the PMS-based sealer, which served as nanofiller, hydration participant, and hydration template to produce compounds that refined the pore structure of the cementitious composites. For the sealers with NC admixed, the pozzolanic reaction of NC with the alkali in the sealer produced more hydration products (K-A-S-H gel); this was confirmed by TG/DTG analysis as disclosed herein.

Figure 3B:
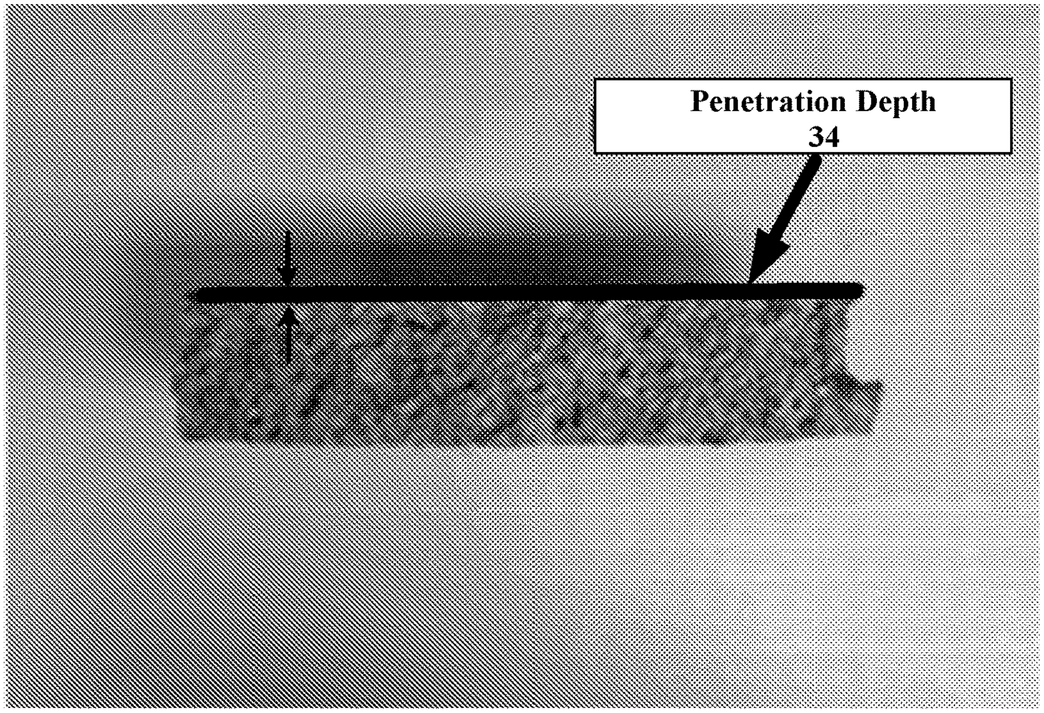
FIG. 3B shows the penetration depth detected by a resultant footprint.
Figure 10A:
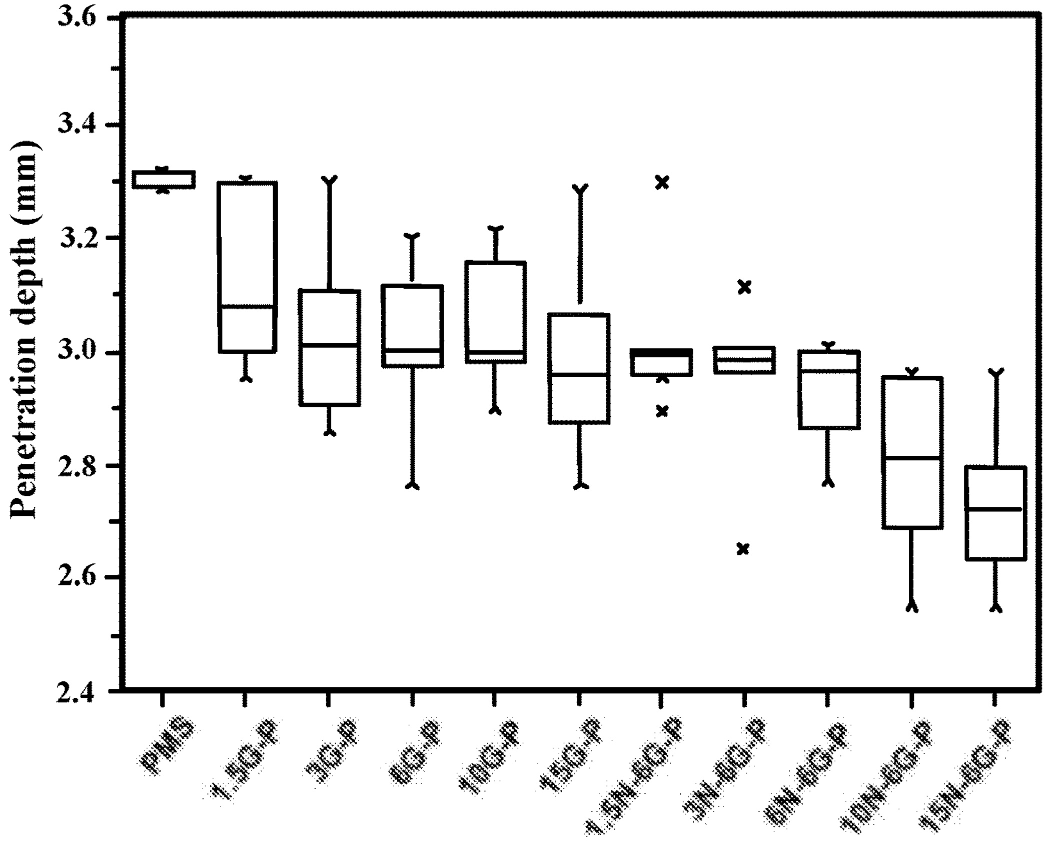
FIG. 10A shows the statistical summary of the penetration depth of various sealers in mortar matrix.
Figure 10B:
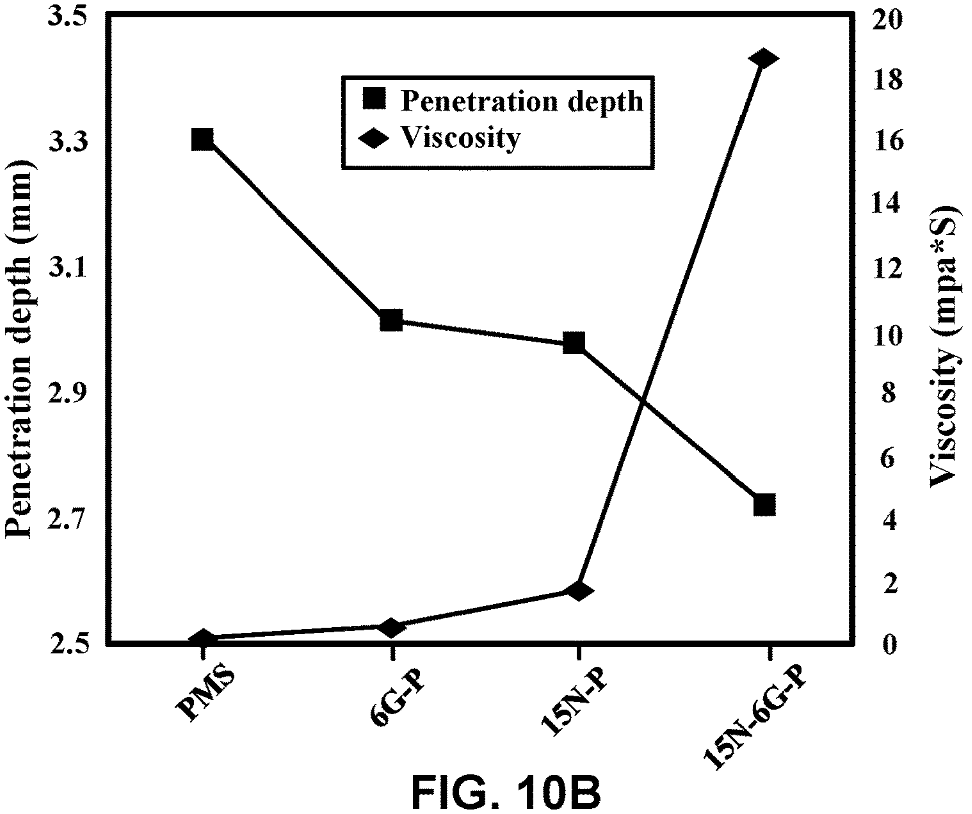
FIG. 10B shows the relationship between penetration depth and viscosity of selected sealers.

Penetration Depth and Viscosity of Sealers:

The admixed nanomaterials significantly increased the viscosity as can be seen in FIG. 10A and reduced the penetration depth of the PMS-based sealer as can be seen in FIG. 10B, especially with the synergistic use of GO and NC. For products of penetrating sealer, penetration depth is an important index that not only assesses their effectiveness but also predicts their effective service life. The service life is the amount of service time before the scaler is abraded away, for instance by traffic on bridges. In the embodiments herein, the footprint of the phenolphthalein-dyed PMS sealer clearly indicated the penetration depth as shown in FIG. 3B. the experimental results for the viscosity are shown in boxplots in FIG. 10A. A scaler application rate of 0.136 L/m$^2$ was used herein as a sample application rate. Higher application rates result in deeper penetration of the sealer. One-way analysis of variance indicates significant differences between the samples, further indicating that admixed nanomaterials significantly affect the penetration depth, and the penetration depth decreases with increased dosage of nanomaterials.

One of the mechanisms associated with the penetration depth results disclosed above is the pore-blocking effect of the admixed nanomaterials. When the PMs-based sealer entered the mortar substrate, the nanomaterials accordingly made their way into the mortar matrix. As nanofillers, these nanoparticles blocked the transport tunnels and reduced the further penetration of the sealer. The second mechanism associated with the decreased penetration depth is the increased viscosity of the liquid PMS sealer as shown in FIG. 10B. Higher viscosity indicates more resistance to sealer migration. It is to be noted that less penetration depth was obtained with more viscous sealer. The increases in sealer viscosity were induced by the interactions between the negatively charged surface groups of NC and GO with the PMS-based sealer components as well as by the chemical reaction of admixed nanomaterials, for example NC with the alkali in the sealer.

Quantitative Models Describing the Relationship Between the Performance Parameters Based on the performance test results, two quantitative models have been developed and disclosed herein to describe the relationships between different aforementioned parameters of the treated mortar and the sealer.

Figure 11A:
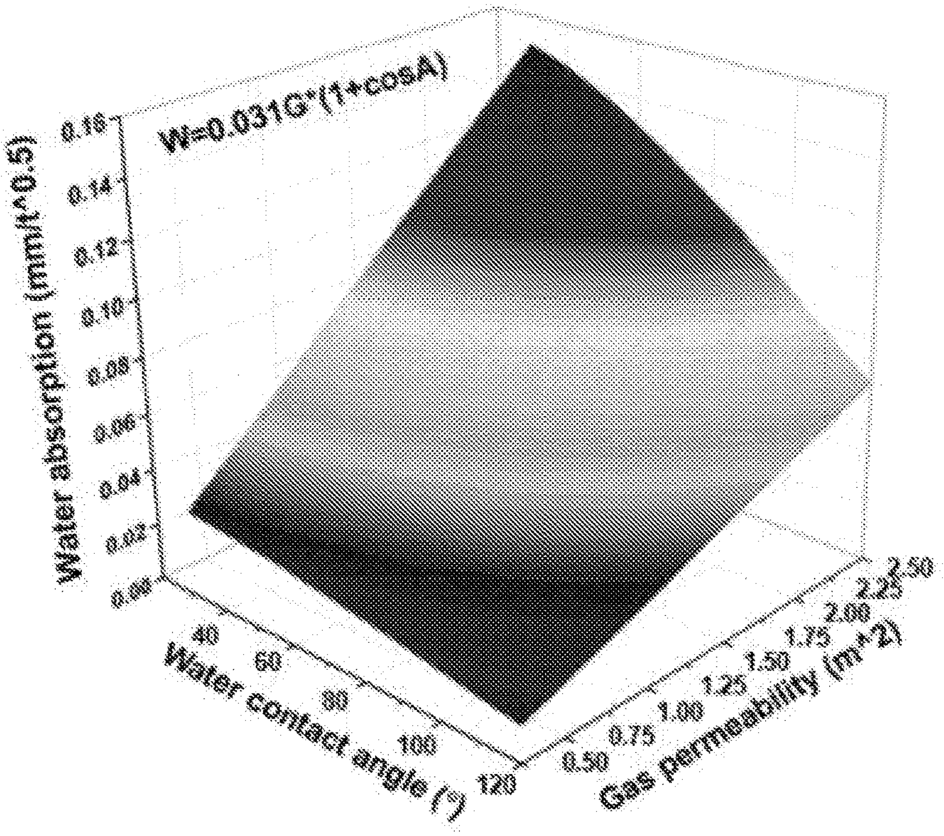
FIG. 11A shows the response surface figure of the relationship between water absorption, water contact angle, and gas permeability.
Figure 11B:
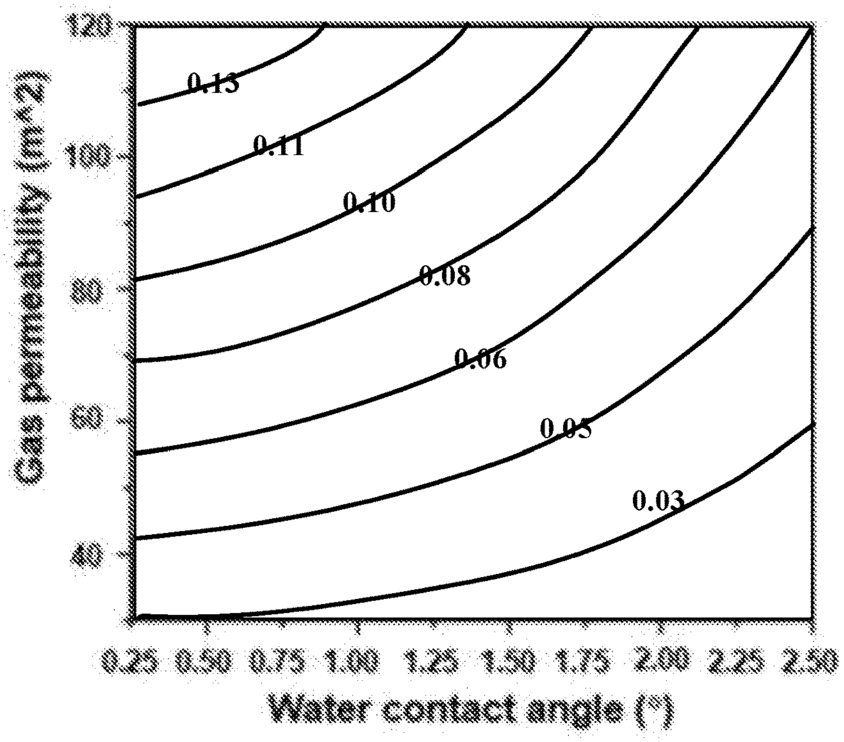
FIG. 11B shows a contour map of the relationship between water absorption, water contact angle, and gas permeability.

Model 1:

Turning to FIG. 11A and FIG. 11B, describing the relationship of water absorption behavior which is strongly correlated with the microstructure and surface hydrophobicity of the mortar substrate. Consequently, model 1 is disclosed herein to illustrate the relationship between water absorption coefficient W, gas permeability G (mainly dependent on the microstructure), and water contact angle A (mainly dependent on the surface hydrophobicity). The higher the water contact angle is, the less water is absorbed, this negative correlation is defined using the cos A term, known to those skilled in the art. The term (1+cos A) has been used to ensure nonnegative term of the water contact angle. FIG. 11A and FIG. 11B illustrate that the increased gas permeability and decreased water contact angle, together correspond to a higher water absorption coefficient and are described as:

$$\text{Model 1}: W = 0.031G*(1+\cos A)+\varepsilon$$

where, W=water absorption coefficient (mm/t$^{0.5}$); G=gas permeability coefficient (m$^2$); A=water contact angle (degrees); and ε=model error.

Figure 12:
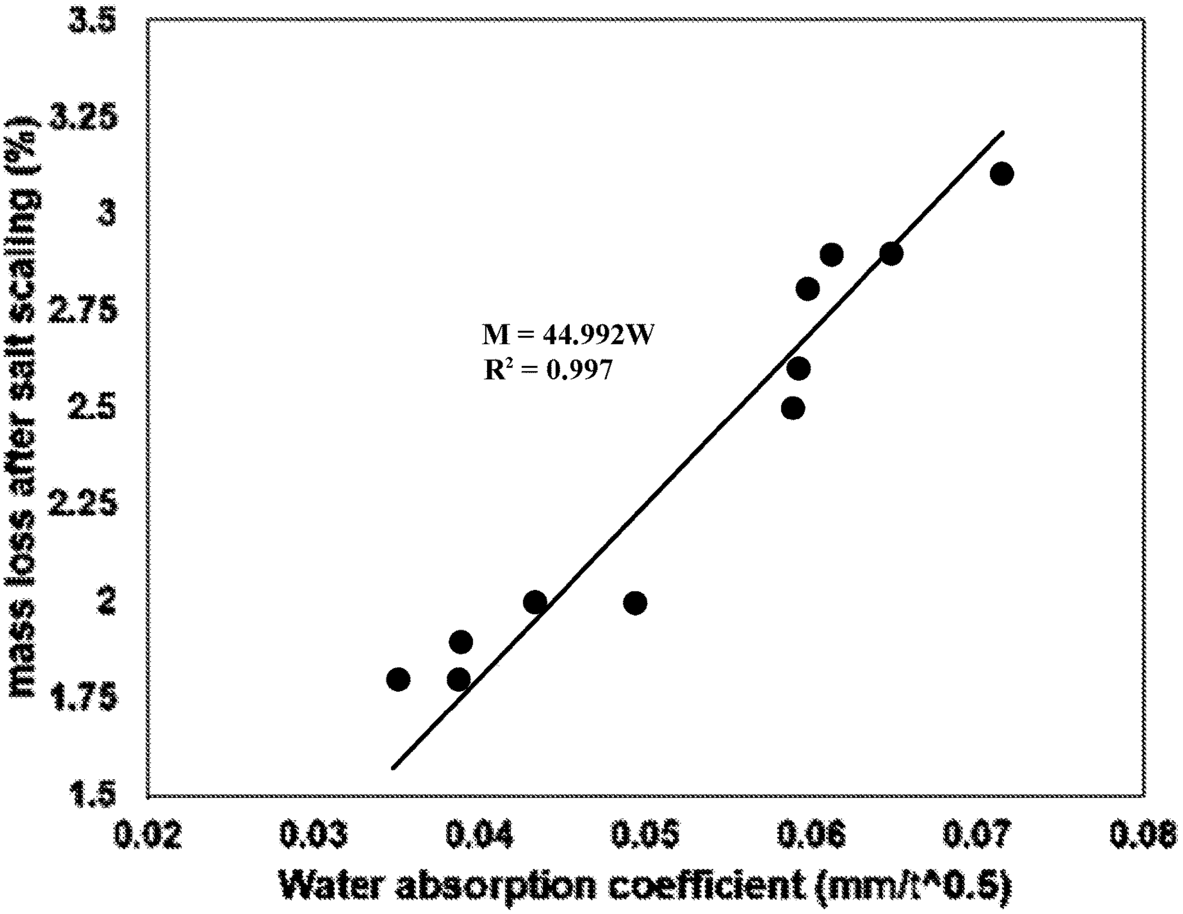
FIG. 12 shows the relationship between mass loss after salt scaling vs. the water absorption coefficient.

Model 2:

Model 2 is disclosed herein to illustrate the relationship between mass loss M after the salt-scaling test (eight cycles of F/T+W/D) and water absorption coefficient W and is represented by FIG. 12. Model 2 indicates that the higher the water absorption coefficient is, the greater the mass loss after the salt-scaling test. This very strong linear relationship confirms the importance of employing the water absorption coefficient to assess and predict the durability of cementitious composites.

$$\text{Model 2; } M = 44.992W + \varepsilon$$

where, M=mass loss after salt-scaling (%); W=water absorption coefficient (mm/$t^{0.5}$); and ε=model error.

The two models, model 1 and model 2 were developed based on the performance test results disclosed herein. These models can be extended with use of more diverse and comprehensive experimental data set.

Figure 13A:
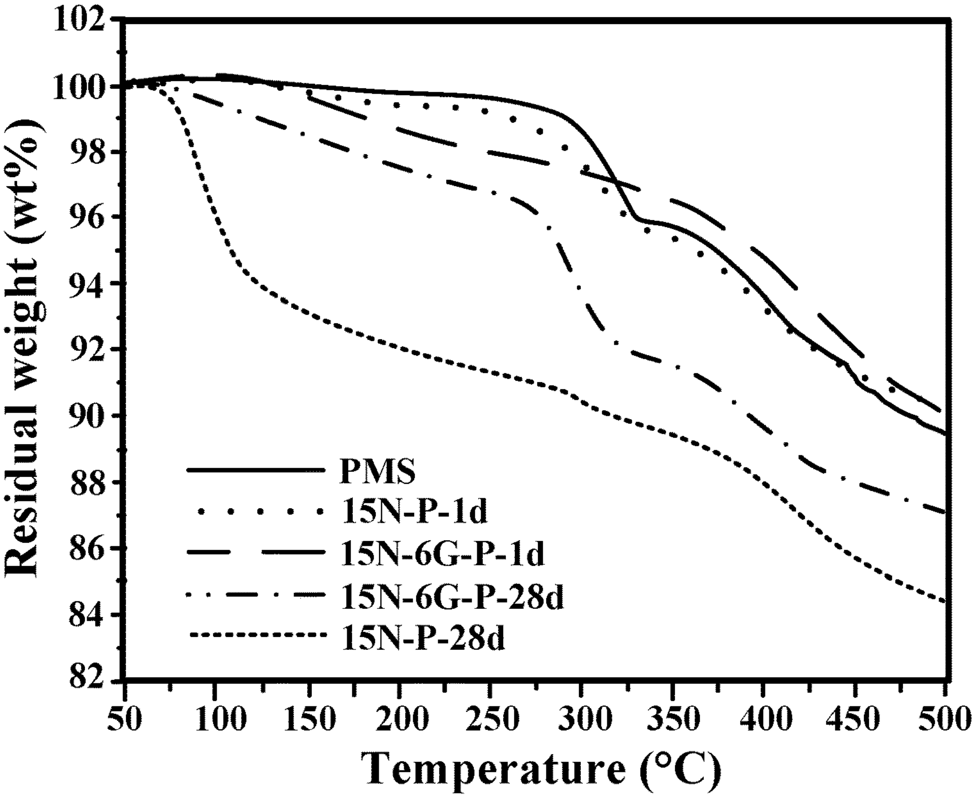
FIG. 13A shows the thermogravimetric analysis of the original PMS, 15N-P-1d, 15N-P-28d, 15N-G-P-1d, and 15N-G-P-28d sealers.
Figure 13B:
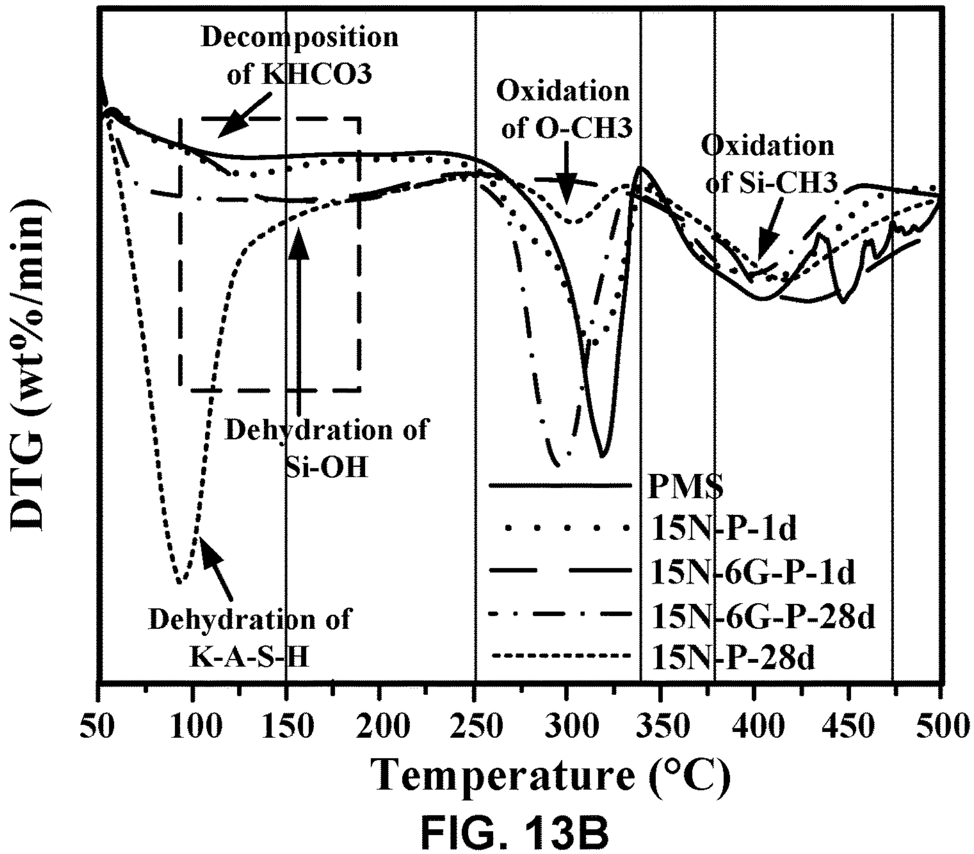
FIG. 13B shows the derivative thermogravimetric results of the original PMS, 15N-P-1d, 15N-P-28d, 15N-G-P-1d, and 15N-G-P-28d sealers.

Thermogravimetric Analysis of Selected PMS Sealers:

Thermogravimetric analysis disclosed herein evaluates the hydration products of the PMS sealer and its nanomodified counterparts and helps showcase the improvements in the aforementioned engineering performance. As shown in FIG. 13A and FIG. 13B, the first obvious mass loss, from about 50° C. to 150° C., was only observed in 15N-P-28d and 15N-6G-P-28d sealer samples, indicating the dehydration of K-A-S-H gel which is derived from the pozzolanic reaction between NC and KOH). For the other sealer samples of the example embodiments disclosed herein, the mass losses that began at approximately 100° C. and 150° C. can be ascribed to the decomposition of $KHCO_3$ and dehydration of Si—OH groups, respectively.

This difference indicates that the PMS sealer preferentially reacted with the admixed NC to produce K-A-S-H gel, minimizing its availability to react with $CO_2$ to produce $KHCO_3$ [as disclosed in FIG. 5A]. The second mass loss, from about 250° C. to 340° C., is attributed to the generation of volatile $CH_3OH$ from the oxidation of —O—$CH_3$ [as disclosed in FIG. 5A]. The third mass loss, from 370° C. to 470° C., is attributed to the release of $CO_2$ from the oxidation of Si—$CH_3$.

No significant mass loss was observed in the 15N-6G-P-1d sample from about 250° C. to 340° C., but there was evident mass loss in its counterparts, 15N-P-1d and 15N-6G-P-28d [as disclosed in FIG. 13B]. This indicates that the admixed GO prevented the oxidation of O—$CH_3$ at an early age, most likely because of strong hydrogen bonding between the hydrophilic GO and —O—$CH_3$. In addition, the remaining masses of the nanomodified PMS samples were lower than that of the original sample [as disclosed in FIG. 13A], indicating that the thermal stability of PMS was degraded by the admixed nanomaterials While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example(s) chosen for purposes of disclosure and covers all changes and modifications which do not constitute departures from the true spirit and scope of this invention.

We claim:

1. A cementitious sealer, comprising:

a hydrophobic sealer layer; and a plurality of first nanomaterials and a plurality of second nanomaterials coupled to the hydrophobic sealer layer, wherein the plurality of first nanomaterials and the plurality of second nanomaterials modifies the sealer chemistry and are arranged as a plurality of solid nanocavities configured to increase a water contact angle via a plurality of solid-liquid-air interfaces.

2. The cementitious sealer of claim 1, wherein the plurality of first nanomaterials and the plurality of second nanomaterials are arranged as an assembly of a plurality of microphase components and a plurality of nanophase components.

3. The cementitious sealer of claim 2, wherein the plurality of microphase components and the plurality of nanophase components are arranged with a micro-/nano-roughness in a range from 150 nm up to 500 nm.

4. The cementitious sealer of claim 2, wherein the plurality of microphase components are configured in an agglomerated configuration;

and the plurality of nanophase components are configured in a dispersed configuration.

5. The cementitious sealer of claim 1, wherein the cementitious sealer is configured to with a plurality of hydrates.

6. The cementitious sealer of claim 1, wherein the water contact angle is up to at least 120°.

7. The cementitious sealer of claim 1, wherein each of the plurality of first nanomaterials and each of the plurality of second nanomaterials is a nanomaterial selected from: a montmorillonite clay, a halloysite clay, a graphene-derived material, a graphene, a reduced graphene oxide, a graphene oxide, a surface functionalized graphene, a zirconium phosphate, a layered double hydroxide (LDH), a nano-fiber, a nano-silica, a nano-hydraulic cement, a carbon nano-tube, a carbon nano-fiber, a nano-cellulose, a cellulose nano-crystal, a cellulose nano-fiber, a bacterial nano-cellulose, a chitin, a nano-iron oxide, a nano-carbonate, a nano-boron, a nano-alumina, a C-S-H (calcium silica hydrate), a C-A-S-H (calcium alumina silica hydrate), a C-S-H/C-A-S-H incorporating Na/K, a nano-titania, a metal-organic framework (MOF), a MXenes, a nano/micro hybrid fly ash, a nano/micro hybrid silica fume, a nano/micro hybrid slag, and a nano/micro hybrid kaolin.

8. The cementitious sealer of claim 1, wherein each of the plurality of first nanomaterials and each of the plurality of second nanomaterials are coupled in a range of dosages from 0.015% up to about 0.15% by the mass of the cementitious sealer.

9. The cementitious sealer of claim 1, wherein the hydrophobic sealer layer includes at least one material selected from: a potassium methyl siliconate, a sodium methyl siliconate, a lithium silicate, a potassium silicate containing silane/siloxane/silyl ether, a sodium silicate containing silane/siloxane/silyl ether, a lithium silicate containing silane/siloxane/silyl ether, a silane/siloxane/silyl ether resin, an emulsified asphalt, an epoxy resin, a polyester, a polyurethane, a polymethyl methacrylate siloxane, and a thermosetting resin.

10. A method for waterproofing a surface, comprising:

sequentially or simultaneously coupling a plurality of first nanomaterials and a plurality of second nanomaterials to a hydrophobic sealer, wherein the plurality of first nanomaterials and a plurality of second nanomaterials modifies the sealer chemistry; and coating a cementitious surface with the modified hydrophobic sealer, wherein the plurality of first nanomaterials and the plurality of second nanomaterials are arranged as a plurality of solid nanocavities configured to increase a water contact angle via a plurality of solid-liquid-air interfaces.

11. The method for waterproofing a surface of claim 10, further comprising: arranging the plurality of first nanomaterials and the plurality of second nanomaterials with a micro-/nano-roughness in a range of 150 nm up to 500 nm.

12. The method for waterproofing a surface of claim 11, further comprising: arranging at least one of the plurality of first nanomaterials and the plurality of second nanomaterials with a plurality of hydrates.

13. The method for waterproofing a surface of claim 11, wherein each of the plurality of first nanomaterials and the plurality of second nanomaterials is a nanomaterial selected from: a montmorillonite clay, a halloysite clay, a graphene-derived material, a graphene, a reduced graphene oxide, a graphene oxide, a surface functionalized graphene, a zirconium phosphate, a layered double hydroxide (LDH), a nano-fiber, a nano-silica, a nano-hydraulic cement, a carbon nano-tube, a carbon nano-fiber, a nano-cellulose, a cellulose nano-crystal, a cellulose nano-fiber, a bacterial nano-cellulose, a chitin, a nano-iron oxide, a nano-carbonate, a nano-boron, a nano-alumina, a C-S-H (calcium silica hydrate), a C-A-S-H (calcium alumina silica hydrate), a C-S-H/C-A-S-H incorporating Na/K, a nano-titania, a metal-organic framework (MOF), a MXenes, a nano/micro hybrid fly ash, a nano/micro hybrid silica fume, a nano/micro hybrid slag, and a nano/micro hybrid kaolin.

14. The method for waterproofing a surface of claim 11, wherein the admixing step includes introducing the plurality of first nanomaterials and the plurality of second nanomaterials in a concentration range from 0.02% to 0.15% of the weight of the nano-sealer.

15. The method for waterproofing a surface of claim 11, wherein the sealer is selected from: a potassium methyl siliconate, a sodium methyl siliconate, a lithium silicate, a potassium silicate containing silane/siloxane/silyl ether, a sodium silicate containing silane/siloxane/silyl ether, a lithium silicate containing silane/siloxane/silyl ether, a silane/siloxane/silyl ether resin, an emulsified asphalt, an epoxy resin, a polyester, a polyurethane, a polymethyl methacrylate siloxane, and a thermosetting resin.

* * * * *